US006073553A

United States Patent [19]

Tweedy et al.

[11] Patent Number: 6,073,553

[45] Date of Patent: Jun. 13, 2000

[54] WORKPIECE CONVEYOR WITH BARREL CAMS INCLUDING A DWELL PERIOD FOR A DECORATING MACHINE

[75] Inventors: Mark R. Tweedy, Valencia; Carl J. Strutz, Mars; John M. Zwigart, New Brighton; Gary W. McCoy, Butler, all of Pa.

[73] Assignee: Carl Strutz & Co., Inc., Mars, Pa.

[21] Appl. No.: 09/207,839

[22] Filed: Dec. 8, 1998

[51] Int. Cl.$^{7}$ .............................. B65G 33/04; B41F 17/08

[52] U.S. Cl. .......................... 101/40; 101/38.1; 101/40.1; 101/44; 198/343.1; 198/467.1

[58] Field of Search ................................. 101/37, 40, 43, 101/44, 4, 40.1, 38.1; 198/343.1, 467.1

[56] References Cited

U.S. PATENT DOCUMENTS

| | | | |
|---|---|---|---|
| Re. 24,961 | 4/1961 | Curtis | 118/316 |
| 2,231,535 | 2/1941 | Jackson et al. . | |
| 2,261,255 | 11/1941 | Jackson . | |
| 2,721,516 | 10/1955 | Campbell et al. . | |
| 3,146,705 | 9/1964 | Ritzerfeld et al. . | |
| 3,172,357 | 3/1965 | Rudolph et al. . | |
| 3,253,538 | 5/1966 | Rudolph et al. . | |
| 3,648,821 | 3/1972 | Rudolph et al. . | |
| 5,471,924 | 12/1995 | Helling | 101/38.1 |
| 5,524,535 | 6/1996 | Strutz et al. . | |

FOREIGN PATENT DOCUMENTS

| | | | |
|---|---|---|---|
| 1259779 | 1/1968 | Germany | 198/310 |

*Primary Examiner*—John S. Hilten
*Assistant Examiner*—Daniel J. Colilla
*Attorney, Agent, or Firm*—Clifford A. Poff

[57] ABSTRACT

The traveling motion imparted to bottles in an intermittent motion decorating machine is provided by a pair of workpiece feed cams rotatably supported in a side-by-side relation to rotate about spaced horizontal axes lying in a common horizontal plane, the workpiece feed cams have feed cam tracks extending along the decorator between loading and unloading stations for receiving cam followers of each of plurality of bottle carriers. The feed cam track defining a workpiece dwell period at each decorating station and workpiece advancement periods between each workpiece dwell period. A pair of carrier return cams is rotatably supported in a side-by-side relation to rotate about spaced horizontal axes lying in a common horizontal plane. The carrier return cams have carrier cam tracks extending along the decorator for returning bottle carriers received from the unloading station for delivery to the loading station. Carrier transfer members at each of opposite ends of the workpiece feed cams and the carrier return cams transfer bottle carriers from the workpiece feed cams at the unloading station to carrier return cams and transfer bottle carriers from the carrier return cams to the workpiece feed cams at the loading station. A drive rotates the workpiece feed cams, carrier return cams and carrier transfer members.

29 Claims, 17 Drawing Sheets

WORKPIECE CONVEYOR WITH BARREL CAMS INCLUDING A DWELL PERIOD FOR A DECORATING MACHINE

BACKGROUND OF THE INVENTION

1. Field of the Invention

The present invention relates to conveying workpieces in a workpiece decorating machine and, more particularly, to imparting traveling motion to workpieces for delivery to and from a decorating station at which traveling motion is interrupted by a dwell period to allow the application of decoration to the workpiece.

2. Description of the Prior Art

As shown in U.S. Pat. Nos. 2,231,535; 2,261,255; 2,721,516; 3,146,705; and 5,524,535 intermittent motion type decorating machines are known in the art and provide an indexing drive system to impart intermittent traveling motion to an endless conveyor chain used to supply workpieces such as containers made of glass or plastic. A container is moved by the endless chain conveyor through a predetermined distance, stopped, moved again through a predetermined distance, stopped and again moved until each container through the sequence of motions moves completely through each of a predetermined number of decorating stations of the decorating machine. A decorating station will be provided at one or more places where the container comes to a stop. At each decorating station while the container is stopped from traveling motion, a decorating screen is displaced into line contact by an associated squeegee with the surface of the container while the container is rotated about a longitudinal axis thereof. During the decorating process a synchronous speed relation is maintained between the linear speed of the screen undergoing linear displacement and the speed of rotation of the container at the line of contact established by the squeegee. The squeegee remains stationary during the decorating process. Decorating machines of this type are particularly useful to decorate bottles and carryout the decoration while the surface of the bottle being decorated is horizontally orientated. In the aforesaid U.S. Pat. No. 2,261,255 there is disclosed a drive for moving each of a screen to decorate a cylindrical body of a bottle and a shoulder screen to decorate a tapered neck portion of the bottle substantially at the same peripheral linear speed. The decorating machine disclosed in the aforesaid U.S. Pat. No. 3,251,298, provided a production rate of about 125 bottles per minute. More recently as disclosed in U.S. Pat. No. 5,524,535 a decorating machine design is provided to increase the production rate of up to 150 bottles per minute. In this decorating machine, the machine cycle is altered to attain the increased production rate. The altered machine cycle provides that the portion of the cycle for conveyor indexing has a reduced duration in order to provide an increased part of the machine cycle for decorating. The reduced cycle for indexing places increased demands for indexing power requirements and number of chains and sprockets to reduce unwanted chain stress. At such production rates, the start and stop events of the intermittent advancement of the endless conveyor impose severe stress and strain on the entire conveyor system including the drive therefore. Typically such a conveyor includes spaced apart horizontal shafts one of which is driven by an indexer drive and the other is an idler shaft. Each shaft supports at least two and sometimes three or more spaced apart sprockets. Wear of the sprocket teeth can be reduced by increasing the number of sprockets and associated chains thereby reducing the loading on each sprocket; however, by increasing the number of sprockets and chains, the power requirements for the indexer drive increase since the mass represented by the conveyor that must be indexed is increased. A sprocket on the driven shaft and the sprocket on the idler shaft engage with an endless chain made up of links connected with carriers for workpieces. The idler sprocket is rotatably supported by bearings and acted upon by a spring loaded tensioner to impose a predetermined tension on the endless chains engaged with the respective sprockets.

In such intermittent motion decorating machines, thermosetting ink was usually the printing medium particularly when multiple color decoration was desired. Ink of only one color is applied at each decorating station and to decorate with multiple colors requires a corresponding multiple decoration stations. When the different-colors interleave in a given area of the bottle, the same area is contacted with the screens for each color and therefore it is necessary that the applied ink/color is a solid and will not smear when additional ink/color is applied. Although the ink is solidified after each printing operation, it was necessary to cure the ink by feeding the bottles through a furnace after discharging from the decorating machine. In co-pending patent application Ser. No. 09/079,753 filed May 15, 1998 there is disclosed a decorating method and apparatus to allow curing of ink decoration applied at one station before additional decoration is applied so that the decoration on a bottle delivered from the decoration machine is cured and the bottle can be loaded directly into a shipping container without the need for curing the ink decoration. The decorating medium is chosen to cure very rapidly when exposed to a source of electromagnetic waves such as ultraviolet radiation or heat. Curing stations are interleaved between printing stations and provided with drives to rotate the bottle at the curing station for exposing uncured printing medium to the electromagnetic wave or heat to curing the printing medium. The dwell period of the intermittent advancing motion by the conveyor chain is used to apply decoration and to cure the applied decoration all at difference spaced apart sites along the course of travel by the bottles in the decorating machine.

The present invention seeks to provide a traveling motion for workpieces interrupted only at a work station which can be the printing station and when desired a curing station in an intermittent motion type decorating machine in a manner representing a complete departure from the conventional practice of using a chain conveyor to support workpieces while intermittently advanced by operation of an indexer drive. The conveyance of workpieces particularly bottles, for example, in intermittent type decorating machines provides that each bottle must dwell at a decorating station for a period of time sufficient to apply the desired decoration. At the decorating station, silk screen printing technique is used for the application of the decoration to a workpiece. This printing technique requires a precise relationship formed by moving the squeegee to establish line contact between a linear moving screen and the rotating surface of the bottle. The line contact established by the squeegee must be in a horizontal plane which is a tangent to the decorating site. The repetitious starting and stopping of the conveyor causes elongation of the metal links due to wear in response to the stress and strain of the conveyor operation. Conveyor stretch adversely affects the relationship between a bottle at a decorating station and the operating position of the squeegee as well as registration of the silk screen relative to the bottle at the decorating station. The conveyor stretch also degrades the accuracy of seam alignment at the indexing operation used to orientate a bottle immediately after loading onto the conveyor chain. A lack of registration of the decoration and the likelihood of smearing of the printing will occur in the event the intermittent motion of the chain conveyor brings a bottle to rest slightly before or slightly after the preselected site for the decorating operation. Also, a misalignment between the longitudinal axis about which the bottle is rotated and a rotational axis about the bottle rotator drive causes a mismatch to the required synchronous speed relation between decorating screen and bottle.

Stretch of the conveyor chain can be compensated by adjustments to the position of the squeegee and screen along the course of travel by the conveyor chain. Eventually the connections between chain links where resulting in excessive clearance with also contributes to an elongation of the conveyor chain. The arrangement of parallel conveyor chains must transmit the torque necessary to achieve the rapid intermittent motion to control movement of not only the mass of the chains and idler sprocket but also the bottle carriers and bottles supported by the carriers. Required operating clearances and the manufacturing tolerance between pivotal surfaces of parts forming chain links typically produce a variation to the chain pitch of 1/1000 of an inch between chain links. If there are, for example, 62 chain links forming each endless chain, the manufacturing tolerance presents a total of 62/1000 of chain links variation which adversely effects the need for an exact positioning of each bottle carrier at a decorating station. The condition clearly becomes worse as the number of links in each continuous chain increases. The mass of the conveyor increases when the size of the link increase which imposes an adverse effect to the drive requirements for the indexing drive. These tolerances presents unwanted variations to the separating distance between carriers. The rapid starting and stopping of the carrier laden chains generate noise, the level of which increases with the indexing rate per minute. Stretch of the chain links occur continuously with the operation of the conveyor and when the quality of registration degrades or at scheduled maintenance intervals, compensating adjustments must be carried out usually at intervals of several months. It has been found that typically chain link stretch and wear between pivotal parts of the chain links degrade the operation of the conveyor beyond acceptable limits and requiring replacement of the chains on an annual basis given normal hours of operation of the decorator.

Workpiece registration at the printing stations is established by adjusting each printing station relative to the location of a workpiece during a dwell period. Not only must the printing stations be adjusted relative to the decorating position of the workpiece but also the indexing registration station and the bottle loading equipment requires similar position correcting adjustments. Chain stretch and the dimensional tolerances between links are factors which limited the length of a conveyor that can be provided in a decorating machine. At each decorating station there is a rotator drive head provided with a slotted opening to receive a roller on the end of a crank arm by which a bottle is rotated for the decorating process. The rotational axis of the bottle and the rotational axis of the drive head must be aligned to produce a uniform rotational speed of the bottle surface to which decoration is applied. Chain stretch causes a misalignment resulting in a nonconcentric rotation between the rotational axis of the bottle and the rotator. As a result, the applied decoration is distorted because of slippage due to the mismatch of speeds between the screens and the bottle surface.

The present invention eliminates the requirement to rapidly accelerate and decelerate a carrier laden chain conveyor containing all bottles or workpieces processed in a decorating machine by providing that only those workpiece laden carriers discharged from a decorating station and entering an empty decorating station are accelerated to a continuous advancing movement. All remaining carriers are advanced by a continuous motion which according to the preferred embodiment, the continuous motion is at a constant speed. The torque requirement to convey workpieces is greatly reduced by this arrangement and the speed at which workpiece laden carriers are advanced from decorating station and to decorating station as well as executing return travel from the exit to the entry end of the decorating machine can be increased significantly to speeds that are not believed obtainable in a conventional chain conveyor system.

It is an object of the present invention to provide a workpiece conveying system wherein only a workpiece discharged from the decorating station and a workpiece entering a decorating station are accelerated from a rate of travel at a continuous speed and wherein workpiece carriers are returned from a discharge end of a decorating machine to the entry end of a decorating machine at a rate of travel which is of a continuous speed.

It is an object of the present invention to provide a workpiece conveying system wherein only a workpiece discharged from a dwell station and a workpiece entering an empty dwell station are accelerated from a rate of travel at a continuous speed, the dwell station being plural in number and include a decorating station and a curing station for printing medium applied at a decorating station and wherein workpiece carriers are returned from a discharge end of a decorating machine to the entry end of a decorating machine at a rate of travel which is of a continuous speed.

It is an object of the present invention to provide a workpiece conveying system supplying a dwell period wherein workpieces are not subject to conveying motion while decorated at decorating stations and at all other times the workpieces are advanced by a continuous motion.

It is another object of the present invention to continuously convey workpieces to and from decorating stations on carriers that are independent and discrete from one another.

It is another object of the present invention to provide a workpiece conveying system having cam tracks in barrel cams to impart traveling motion to carriers with and without workpiece in an endless fashion for an intermittent motion type decorating machine.

It is another object of the present invention to provide a tandem arrangement of barrel cams driven to rotate about a common longitudinal axis for advancing a plurality of separate and independent workpiece carriers along continuous cam tracks of the barrel cams and a carrier transfer disk between the tandem arrangement of cams for delivering a workpiece carrier from a cam track in one of the tandemly arranged barrel cams to the cam track of the other tandemly arranged barrel cams and thereby provide a conveyor system for an intermittent type decorating machine of an unusually great length and an unusually low torque requirement for a multiplicity of decoration operations without the need to provide more than one decorating machine.

SUMMARY OF THE PRESENT INVENTION

According to the present invention there is provided an apparatus to advance workpieces for applying decoration, the apparatus including the combination of: an intermittent motion decorator having a decorating station at which a workpiece dwells while decoration is applied thereto; a plurality of independent carriers each having workpiece support members to support a workpiece for traveling advancing movement relative to the decorating station, each of the carriers including a cam follower and carrier guide members; a workpiece feed cam having a feed cam track receiving cam followers of the carriers for imparting traveling motion to advance the carriers relative to the decorating station, the cam track defining at least a continuous carrier traveling motion during which the carriers advance independently and continuously toward the decorating station during decoration of a workpiece on a carrier dwelling at the decorating station for a dwell period defined by the cam track; a drive to rotate the workpiece feed cam; and a guide engaged with the carrier guide members for supporting the carriers and maintaining the feed cam follower of each of the carriers drivingly engaged with the feed cam track.

In more specific terms the present invention provides an apparatus to advance workpieces for applying decoration, the apparatus including the combination of a decorator having a plurality of decorating stations spaced along a path of travel for workpieces between entry and discharge paths for applying decoration to workpieces, a plurality of carriers each having spaced apart workpiece support chucks and a rotator for rotating a workpiece supported thereby about a longitudinal axis of the workpiece, each carrier further including a base supporting the chucks on one side thereof and spaced apart cam followers supported on a side of the base opposite the chucks, each of the carriers further including horizontal and vertical support members carried at each of opposite ends of the base thereof, spaced apart endless guide tracks supported by the extending along the path of travel for workpieces in an endless fashion along said plurality of said decorating stations for engaging the horizontal and vertical support members extending to guide each carrier, a pair of workpiece feed cams rotatably supported in a side-by-side relation by the decorator to rotate about spaced horizontal axes lying in a common horizontal plane, the workpiece feed cams having feed cam tracks extending along the decorator between the entry and discharge paths for receiving the cam followers of each of the plurality of carriers, the feed cam track defining a workpiece dwell period at each of the decorating stations and workpiece advancement periods between each workpiece dwell period and along the entry and discharge paths, a pair of carrier return cams rotatably supported in a side-by-side relation by the decorator to rotate about spaced horizontal axes lying in a common horizontal plane, the carrier return cams having carrier cam tracks extending along the decorator for returning carriers received from the discharge path for delivery to the entry path, carrier transfer members at each of opposite ends of the workpiece feed cams and the carrier return cams for transferring carriers to the entry path from the discharge path to the carrier return cams, and a drive to rotate the workpiece feed cams, carrier return cams and carrier transfer members.

The present invention further provides a method for advancing workpieces to apply decoration, the method including the steps of engaging opposite ends of successive ones of a plurality of workpieces for support about a longitudinal axis of each workpiece, continuously advancing spaced apart workpieces toward and decorated workpieces away from a workpiece being decorated during a dwell period at a decorating station, the space between the workpiece being decorated and the workpiece next to be decorated ever decreasing and the space between the workpiece being decorated and the last decorated workpiece ever increasing, decorating each workpiece at the decorating station, terminating the dwell period of the decorated workpiece at the decorating station by advancing the decorated workpiece from the decorating station, and advancing the next to be decorated workpiece to the decorating station.

BRIEF DESCRIPTION OF THE DRAWINGS

The present invention will be more fully understood when the following description is read in light of the accompanying drawings in which.

DETAILED DESCRIPTION OF THE PREFERRED EMBODIMENTS

Figure 1:
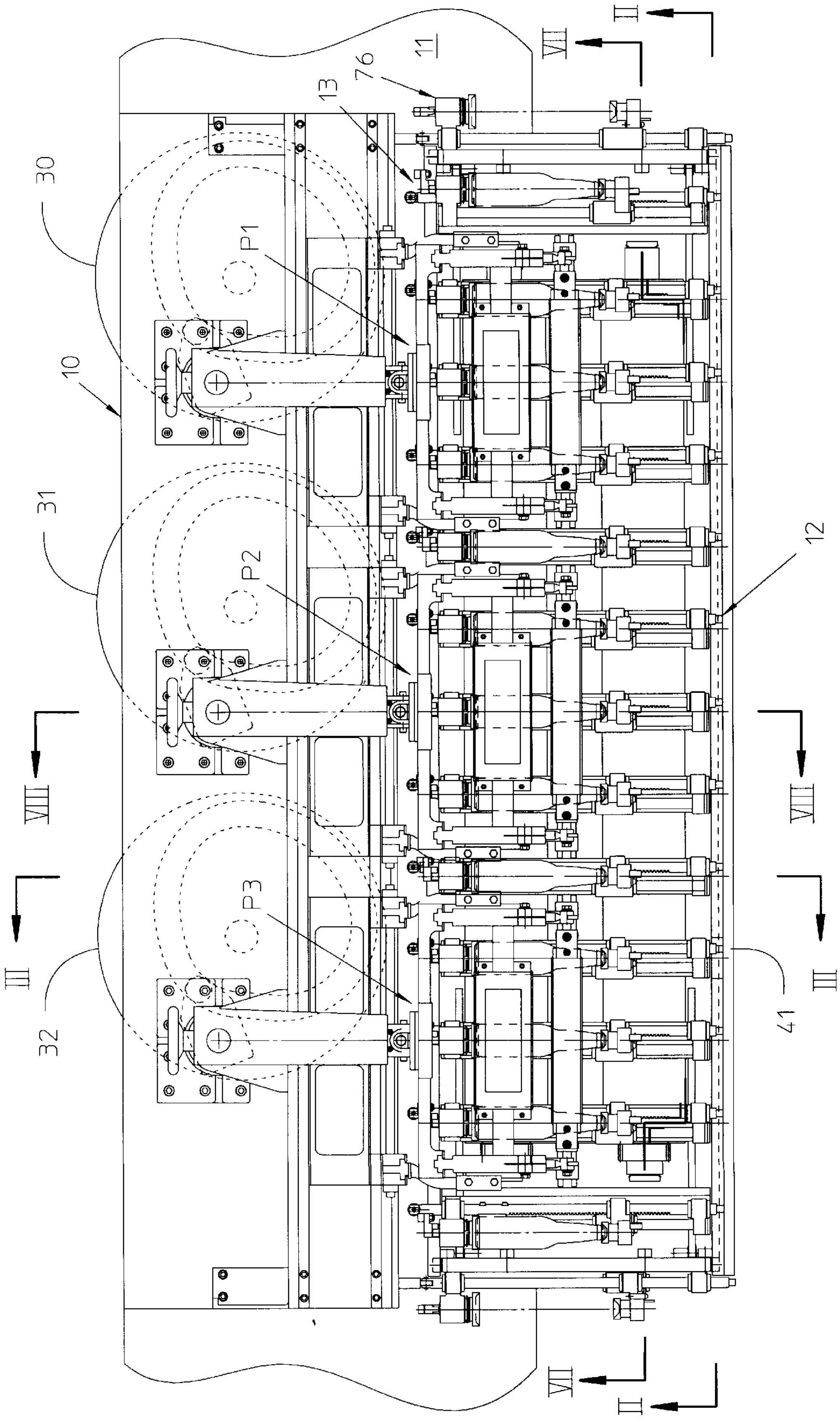
FIG. 1 is a plan view of an intermittent decorating machine incorporating a workpiece conveyance according to a preferred embodiment of the present invention.
Figure 2:
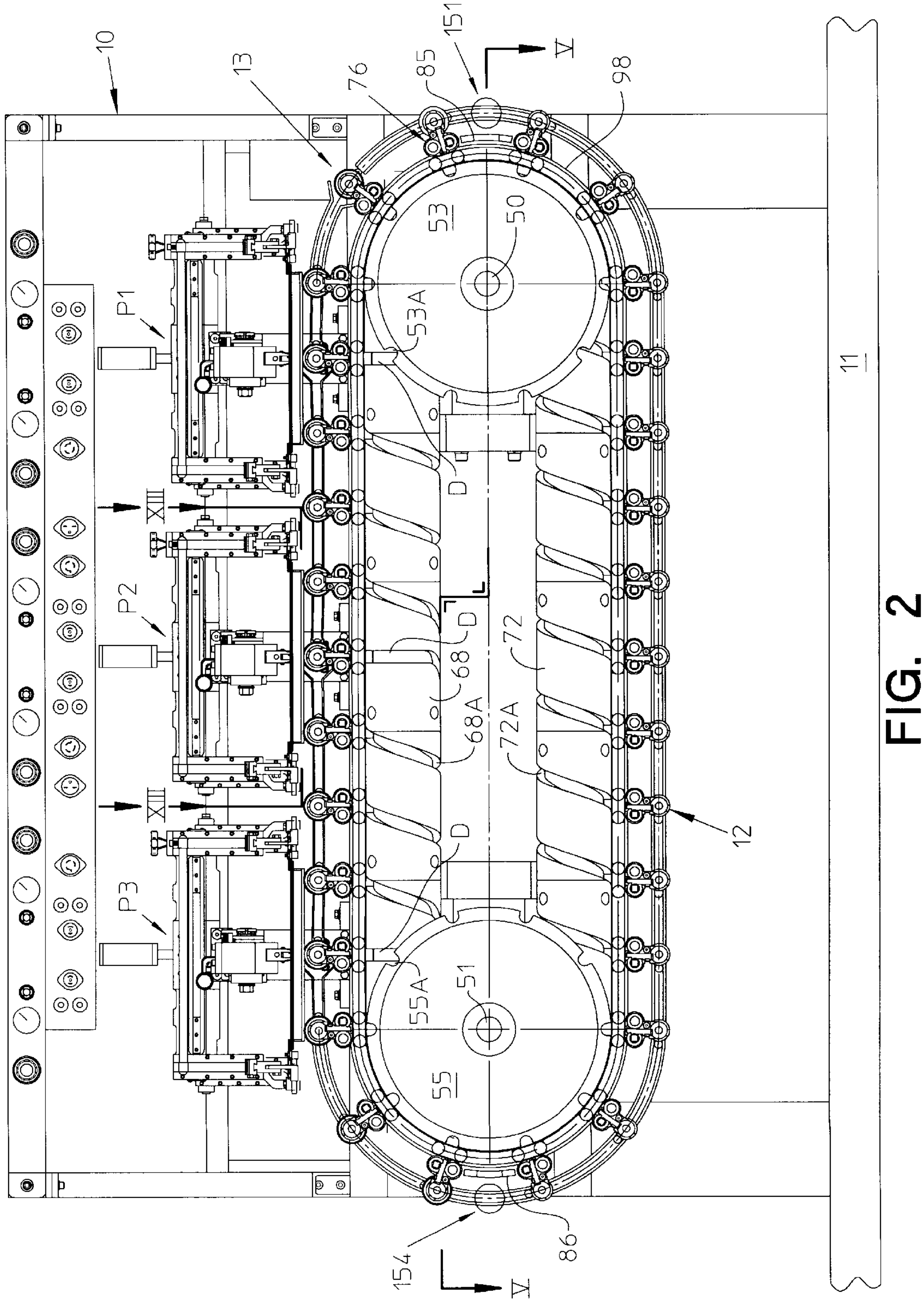
FIG. 2 is a front elevational view in section taken along lines II—II of FIG. 1.

Referring now to FIGS. 1 and 2 of the drawings, there is illustrated a decorating machine 10 in the preferred form includes a base 11 for supporting a workpiece conveyor 12 embodying a construction according to the preferred embodiment of the present invention to convey workpieces which, for the purpose of describing the preferred embodiment of the present invention, consist of bottles. The conveyor receives bottles from bottle loading equipment, not shown, and advances the bottles to a registration station 13 and thence to three successively arranged decorating stations P1, P2 and P3. The bottles are advanced from the last decorating station P3 to bottle unloading equipment, not shown.

Figure 3:
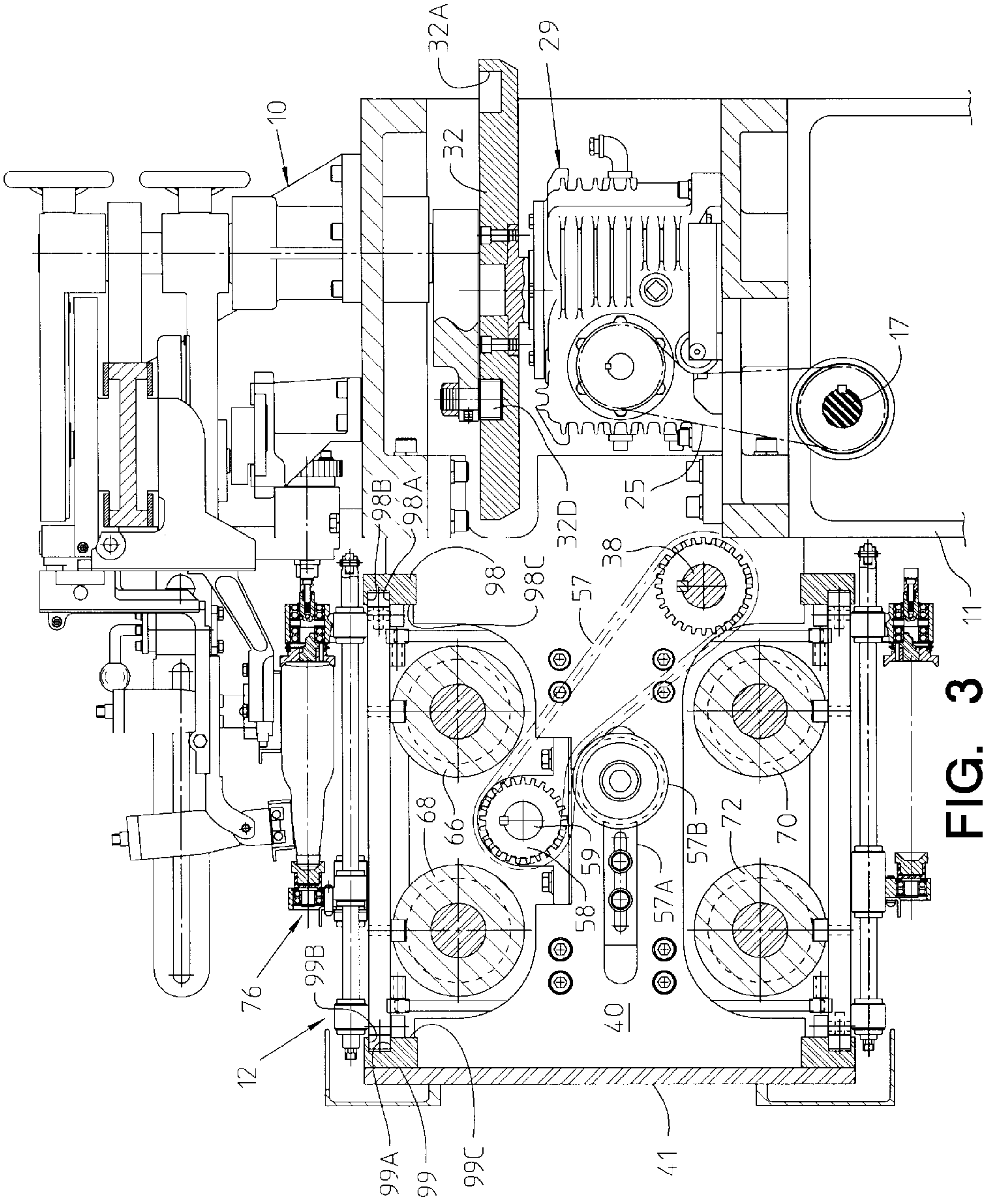
FIG. 3 is a sectional view taken along lines III—III of FIG. 1.
Figure 4:
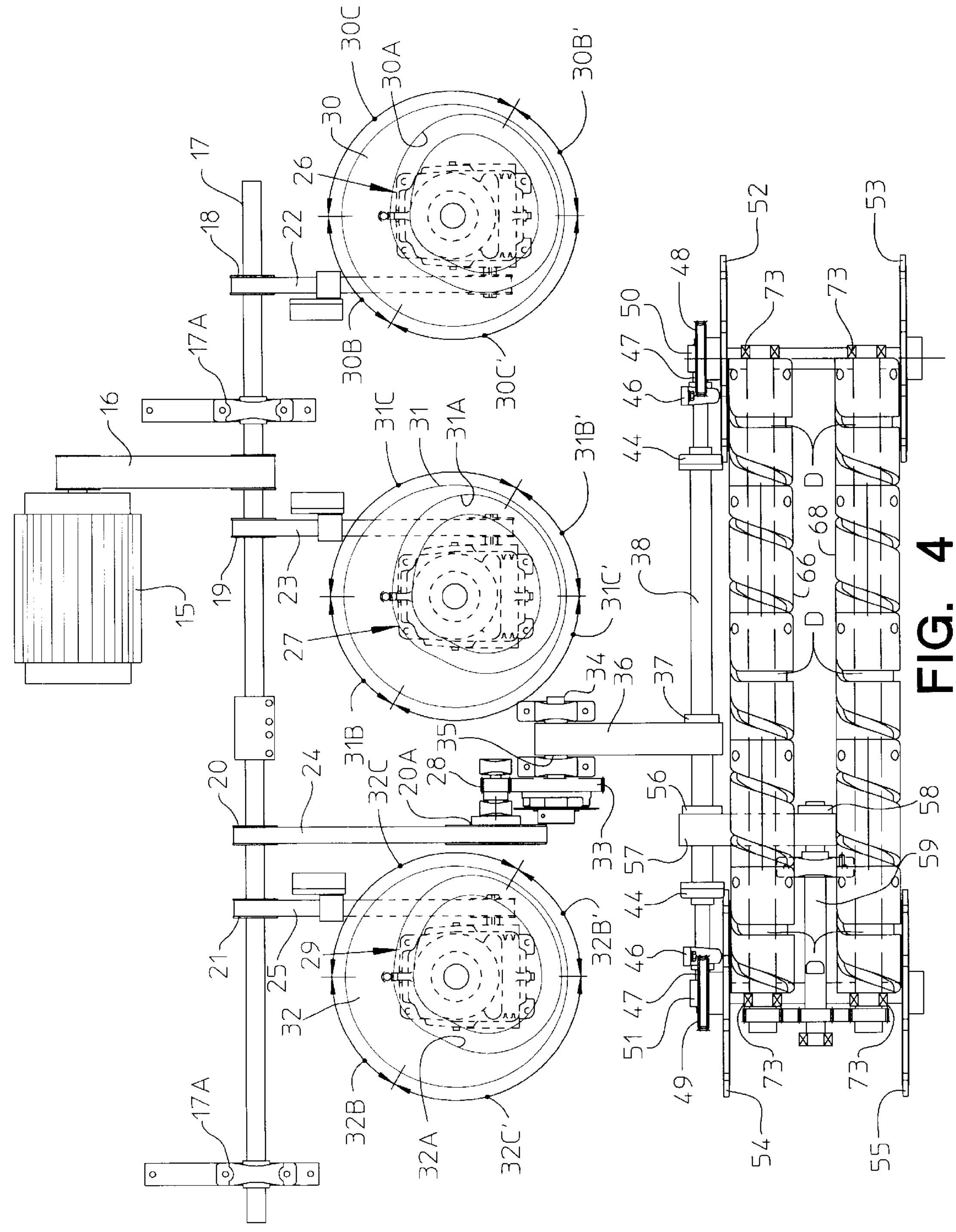
FIG. 4 is a schematic drive layout illustrating the major drive components comprising the decorating machine of FIG. 1.

The drive arrangement for the decorating machine includes, as shown in FIGS. 3–6, a main drive motor 15 having a drive output shaft connected by a belt 16 to a first line shaft 17 rotatably supported by spaced apart pillow blocks 17A. Spaced along line shaft 17 are four pulleys 18, 19, 20 and 21 provided with belts 22, 23, 24 and 25, respectively. The belts 22, 23 and 25 extend to gear drives 26, 27 and 29, respectively. The gear drives 26, 27 and 29 have output shafts secured to rotate cams 30, 31 and 32 (FIGS. 1, 3 and 4). The cams 30–32 are formed with closed cam tracks 30A, 31A and 32A also known as a face groove or positive cam. Bottles are decorated at each decorating station in an identical fashion by initiating screen travel when a bottle arrives at the decorating station. FIG. 4 illustrates the cam tracks 30A, 31A and 32A of the respective cams are each constructed to form two bottle decorating cycles separated by a screen dwell cycle. More specifically, cam track 30A consists of a screen dwell cycle 30B, bottle decorating cycle 30C, screen dwell cycle 30B' and a bottle decorating cycle 30C'. Cam track 31A consists of a screen dwell cycle 31B, bottle decorating cycle 31C, screen dwell cycle 31B' and a bottle decorating cycle 31C'. Cam track 32A consists of a screen dwell cycle 32B, bottle decorating cycle 32C, screen dwell cycle 32B' and a bottle decorating cycle 32C'. In the first bottle decorating cycle, the decorating screens at each decorating station P1, P2 and P3 are linearly displaced in one direction during which one bottle is decorated at each decorating station. After these bottles are decorated, the screens remain stationary during screen dwell cycles and then the screens are reciprocated in the opposite direction during which succeeding bottles are decorated at each decorating station. The cam tracks 30A, 31A and 32A define the precise occurrence of events with respect to the movement of the bottles by the workpiece conveyor since the cams 30–32 and the workpiece conveyor are drivenly interconnected in the same drive train and driven by the same main drive motor 15. Each cam has a follower in the respective cam track to pivot an oscillating drive output at each of the decorating stations as will be discussed in greater detail hereinafter. The belt 24 driven by the first line shaft 17 extends to a pulley 20A mounted on a rotatably supported shaft having a gear 28 meshing with a gear 33. Gears 28 and 33 form a speed reduction relationship. Gear 33 is mounted on an intermediate shaft 34 supported by pillow blocks and having a pulley 35 provided with a belt 36 extending to a pulley 37 mounted on a second line shaft 38.

Figure 5:
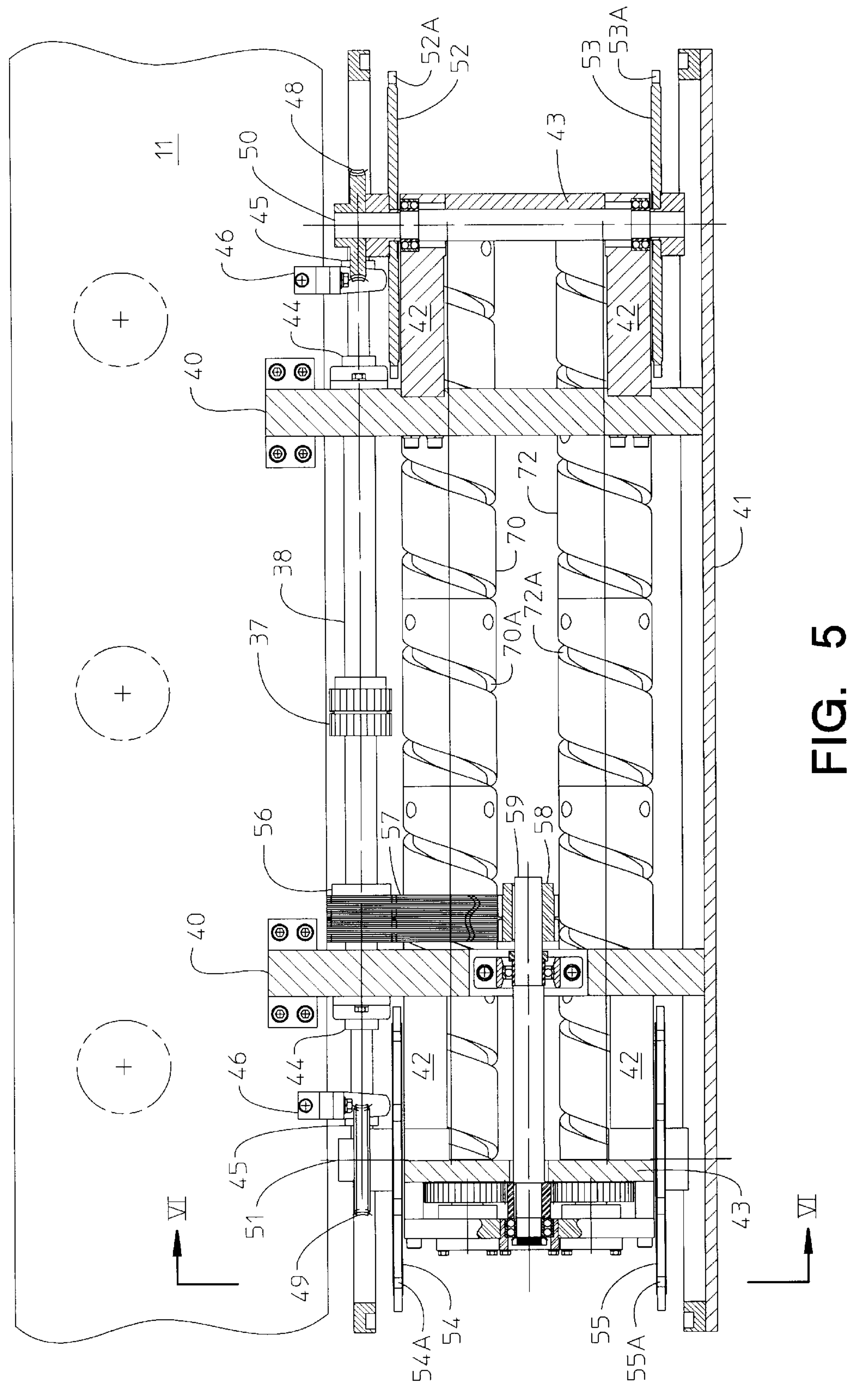
FIG. 5 is a plan view taken along lines V—V of FIG. 3.
Figure 6:
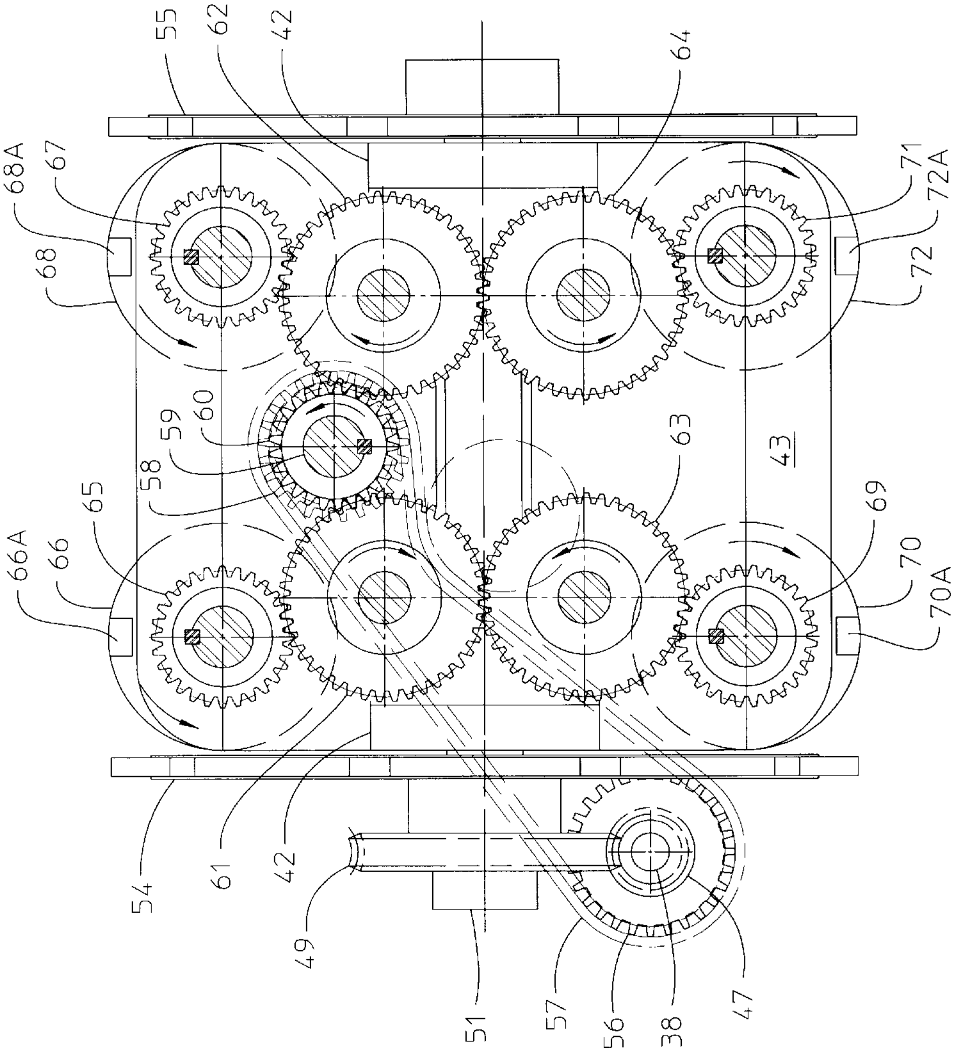
FIG. 6 is an enlarged end elevational view taken along lines VI—VI of FIG. 5.

As shown in FIGS. 5 and 6, line shaft 38 is rotatably supported by two spaced apart arms 40 extending from the base 11 in a cantilever fashion and secured by bolts to the base of the decorating machine. The outer most ends of the arms 40 are connected to an elongated cover plate 41. Secured to each of the arms 40 are spaced apart spacers 42 that extend horizontally and outwardly in opposite directions from the arms 40. The outer ends of the spacers 42 carry vertically extending mounting plates 43 from which various drive gears project only at the unload end of the conveyor. The second line shaft 38 is rotatably supported by bearings 44 mounted on portions of the arms 40 adjacent the base 11 and latterly outwardly of each of the bearings 44 there is also a bearing assembly 45 mounted by a carrier bracket 46 to the base 11. The bearing assemblies 45 rotatably support the outer end portions of the second line shaft 38. Outwardly of each bearing assembly 45 there is a worm gear 47 mounted on each of the terminal end portions of the second line shaft 38. A worm gear 47 at the loading end of the decorating machine meshes with a gear wheel 48 and the worm gear at the unloading end of the decorating machine meshes with a gear wheel 49. The gear wheels 48 and 49 are mounted on drive shafts 50 and 51, respectively.

Figure 7:
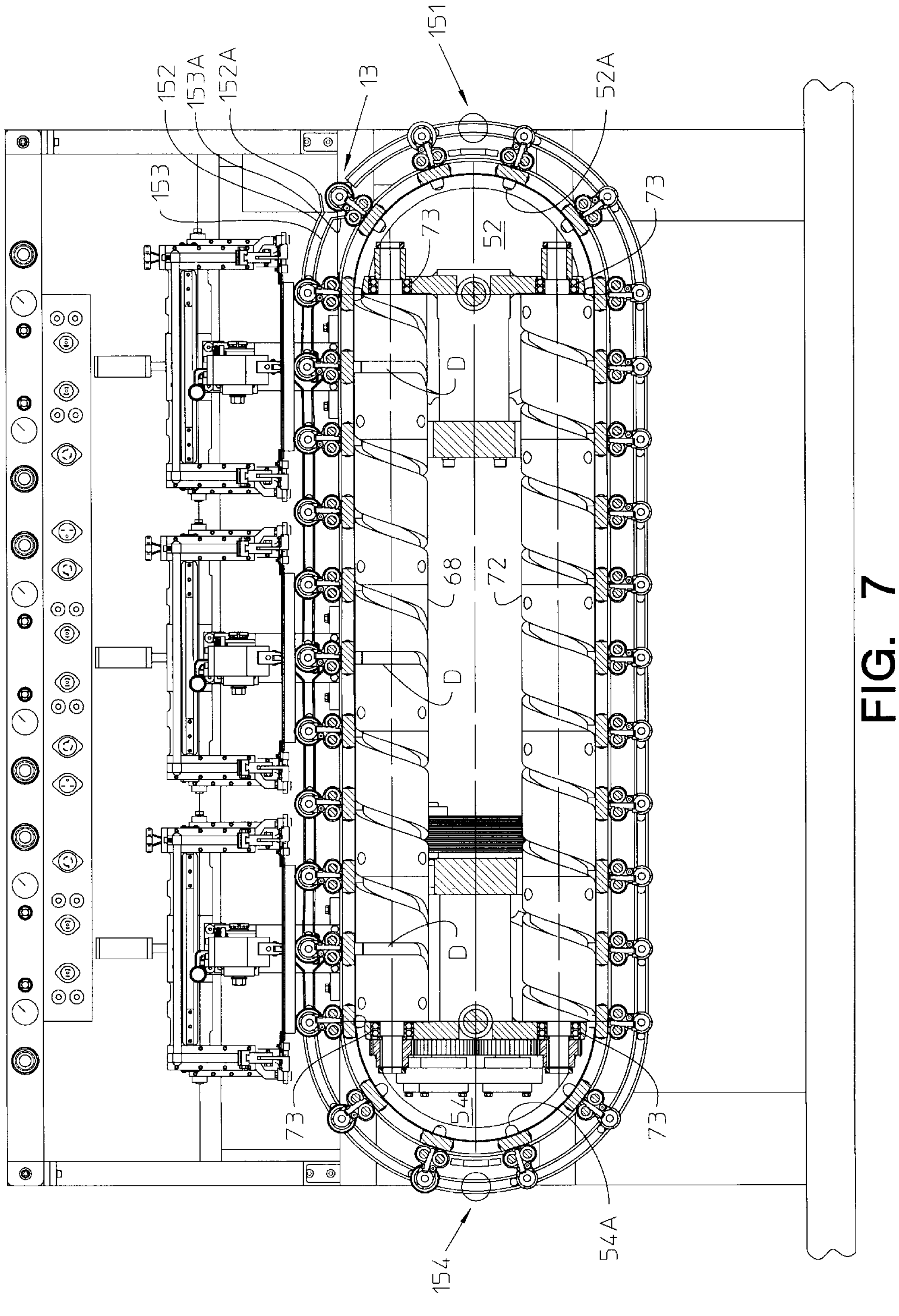
FIG. 7 is an elevational view in section taken along lines VII—VII of FIG. 1.

Spaced apart carrier supply disks 52 and 53 are mounted on the inboard and outboard ends, respectively, of drive shaft 50 and spaced apart carrier return disks 54 and 55 are mounted on the inboard and outboard ends, respectively, of drive shaft 51. A pulley 56 is mounted on the second line shaft 38 and joined by a drive belt 57 to a pulley 58 mounted on a drive shaft 59 extending horizontally above the drive shaft 51. Tension in the drive belt 57 is controllably set by using fasteners to secure a roller support arm 57A rotatably supporting a slack adjusting roller 57B in a fixed position to arm 40 for establishing the position for roller 57B to impose a desired tension on belt 57. As shown in FIG. 6, a drive pinion gear 60 is mounted on the horizontally extended end of drive shaft 59 and meshes with idler gears 61 and 62 which in turn mesh with idler gears 63 and 64, respectively. Idler gear 61 meshes with a drive gear 65 mounted on support shaft of a barrel cam 66; idler gear 62 meshes with a drive gear 67 mounted on a support shaft of a barrel cam 68; idler gear 63 meshes with a drive gear 69 mounted on a support shaft of a barrel cam 70; and idler gear 64 meshes with a drive gear 71 mounted on a support shaft of a barrel cam 72. As shown in FIGS. 4, 6 and 7, the barrel cam 66, 68, 70 and 72 are rotatably supported by bearings 73 carried on the support shafts at opposite ends of the barrel cams. The bearings 73 are mounted in suitable apertures formed in the vertically extending mounting plates 43 such that the barrel cams can rotate about horizontal axes with the axes of barrel cams 66 and 68 lying in a common horizontal plane and there below the axes of rotation of barrel cams 70 and 72 lie in a common horizontal plane. Each of the barrel cams 66, 68, 70 and 72 have closed cam tracks 66A, 68A, 70A and 72A which is a continuous groove milled in the cam body engaged by a roller attached to a follower for executing movements by workpiece carriers as will be described in greater detail hereinafter to provide continuous traveling motion until interrupted by a dwell period "D" provided for the printing operation.

Figures 12A, 12B, 12C:
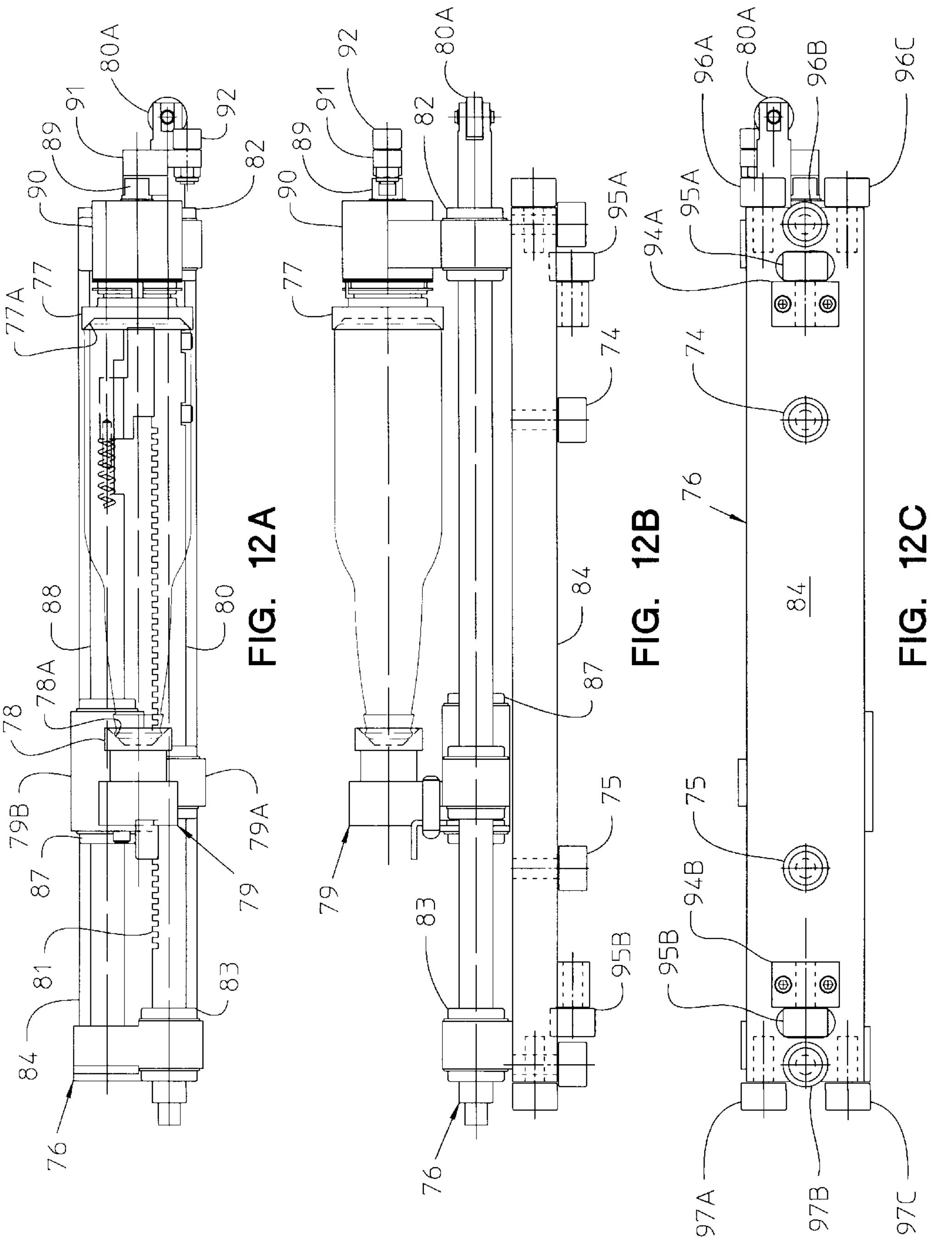
FIG. 12A is a plan view of a bottle carrier taken along lines XII—XII of FIG. 8.
FIG. 12B is a side elevational view of the bottle carrier shown in FIG. 12A.
FIG. 12C is a bottom plan view of the bottle carrier shown in FIG. 12A.

As in FIGS. 2, 6, 8 and 12A–12C, the closed cam tracks 66A, 68A, 70A and 72A receive spaced apart roller parts of cam followers 74 and 75 mounted on each of a plurality of discrete and independently moveable bottle carriers 76. The details of the construction of the bottle carriers is best shown in FIGS. 12A–12C. Each bottle carrier is provided with a base cup 77 having a shallow support surface 77A surrounded by a protruding beveled edge to receive and center the base section of the bottle. A mouthpiece 78 has a shallow support surface 78A surrounded by a protruding beveled edge to receive and center the mouth of a bottle. Mouthpiece 78 is rotatably supported by neck chuck 79 having diverging support legs 79A and 79B. Leg 79A is selectively positionable along an actuator shaft 80 having teeth 81 for engaging a releasable latch to allow clamped positioning of the mouthpiece 78 relative to the base cup 77 at any of diverse sites to accommodate a particular height of a bottle between the base cup and mouthpiece. The actuator shaft 80 is slidably supported by spaced apart linear bearings 82 and 83 mounted on an elongated carrier plate 84. An actuator cam follower 80A is rotatably supported by an end portion of shaft 80 which protrudes from the bearing adjacent the base cup 77 for contact with cam surfaces 85 and 86 of actuator cams (FIG. 2) mounted on the base of the decorating machine at the entry and deliver ends thereof respectively. The cam surface 85 increases the distance separating the base cup 77 and the neck chuck 79 to allow loading of a bottle between the cup and chuck and similarly at the bottle unloading site the cam surface 86 again increases the distance separating the base cup and the neck chuck to allow removal of the bottle from the carrier. The neck chuck 79 is provided with a linear bearing 87 resiliently supported by a support shaft 88 in the same manner as disclosed in U.S. Pat. No. 3,338,574 whose disclosure is incorporated herein by this reference thereto.

Figure 8:
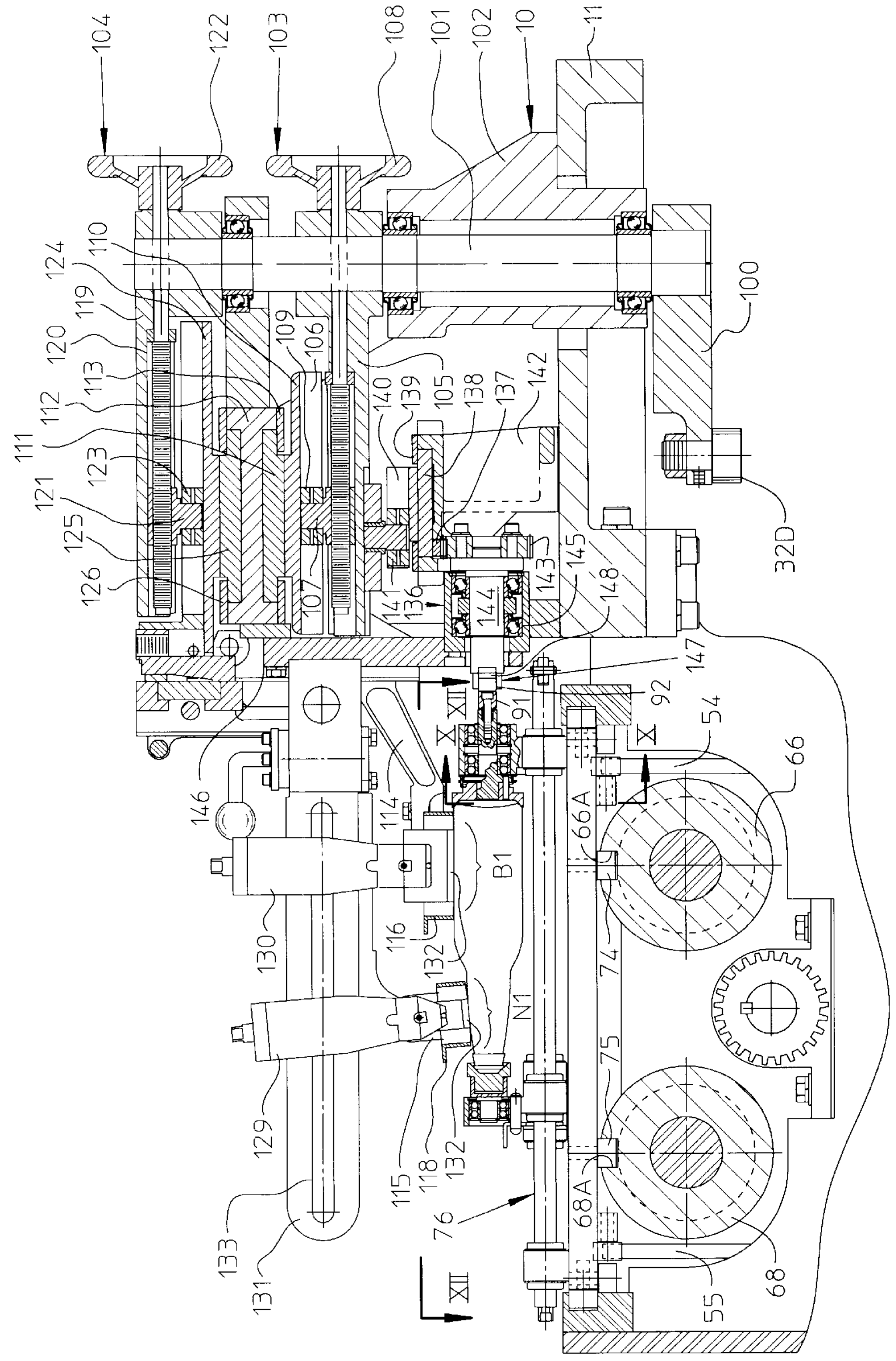
FIG. 8 is a fragmentary sectional view taken along lines VIII—VIII of FIG. 1.

As shown in FIGS. 5, 8, and 12A–12C extending from the base cup 77 is a journal 89 which is rotatably supported by a bearing in an upstanding housing 90. An end part of the journal 89 is bolted to a crank arm 91 extending perpendicular to the rotational axis of journal 89. The free end of arm 91 supports a drive roller 92 for rotating the base cup at the registration station, not shown, and a bottle at each of the decorating stations P1, P2 and P3. As shown in FIGS. 8–10 and 12A–12C, laterally outwardly from the cam followers 74 and 75 there are mounting blocks 94A and 94B secured to the bottom surface of the carrier plate 84. The mounting blocks 94A and 94B support rotatable follower rollers 95A and 95B, respectively, which pass into engagement is with horizontally aligned cavities 52A and 53A distributed about the outer peripheral edges of the supply disks 52 and 53 when cam followers 74 and 75 exit cam tracks 70A and 72A of the barrel cams 70 and 72. Similarly, the follower rollers 95A and 95B, respectively, which pass into engagement with horizontally aligned cavities 54A and 55A distributed about the outer peripheral edges of carrier return disks 54 and 55 when cam followers exit cam tracks 66A and 68A of the barrel cams 66 and 68 (FIGS. 6 and 8).

The bottle carriers are each sequentially transferred from an established positive driving relation with barrel cams 66 and 68 into a positive driving relation with carrier disks 54 and 55 and transferred from carrier disks 54 and 55 into a positive driving relation with barrel cams 70 and 72 and thence from barrel cams 70 and 72 to a positive driving relation with carrier disks 52 and 53 and complete a conveyance cycle transfer from carrier disks 52 and 53 into a positive driving relation with barrel cams 66 and 68. The cams to disks transfer is always the same and the transfer from disks to cams is always the same. The sequence of events for the transfer from disks to cams is the reversal of the sequence of events for the transfer from cams to disks. The bottle carrier transfer for one end of the bottle carrier is schematically shown in FIGS. 11A–11D for the disk 53 to barrel cam 68 via cam followers 95B and 75, it is to be understood that the same relationship between disks 52, cam 66 and cam followers 74 and 95A at the end of the bottle carrier adjacent to the decorating machine.

Figures 11A, 11B, 11C, 11D:
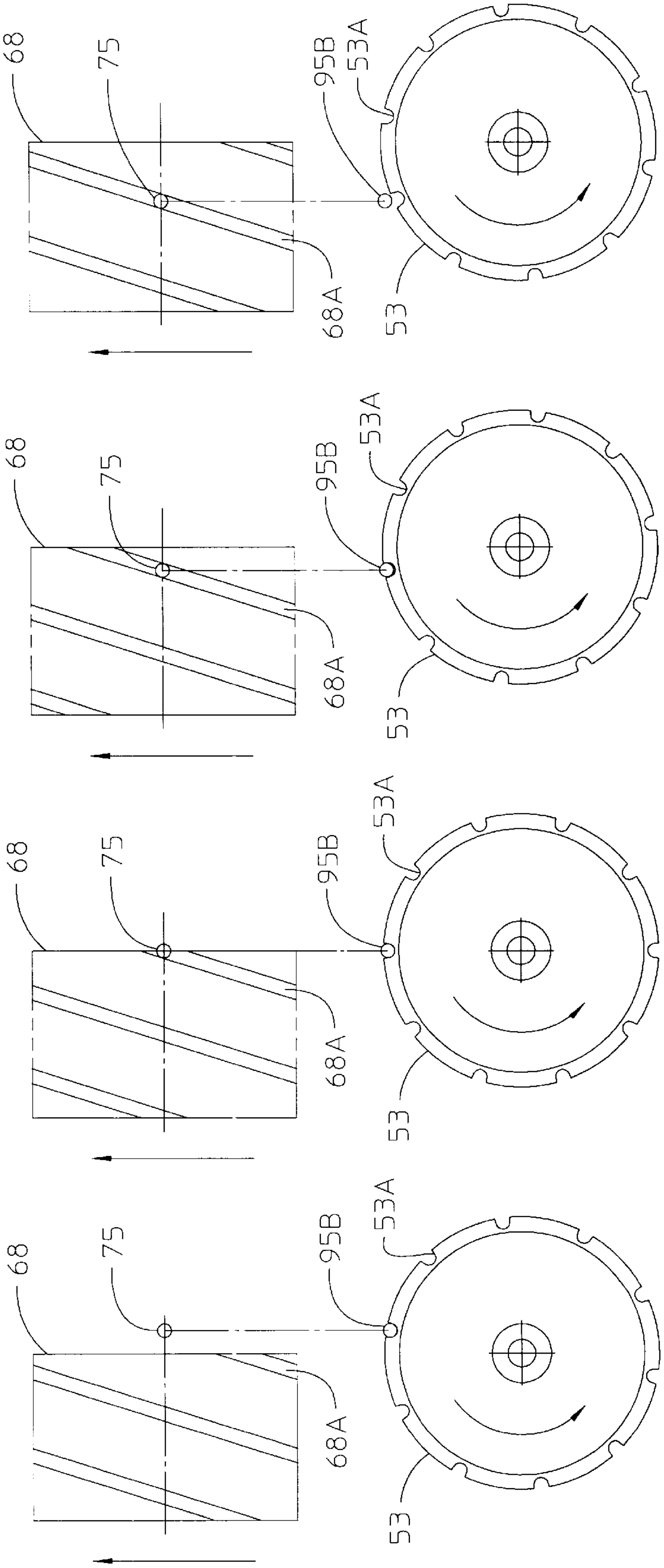
FIGS. 11A, 11B, 11C and 11D are displacement diagram views illustrating the tiling sequence for the conveyance control of a bottle carrier during transfer from a transfer disk to a barrel cam.

In FIG. 11A, the cam follower 95B is seated in cavity 53A of disk 53 and cam follower 75 resides at the entrance of cam track 68A in barrel cam 68. As shown in FIG. 11B, as disk 53 rotates clockwise, follower 95B is carried in cavity 53A to a 12 o'clock position of disk 53 and the barrel cam 75 rotates in the direction indicated by an associated arrow bringing the cam track 68A into a position so that the site for entrance to cam track 68A is positioned for entry of follower 75. As shown in FIG. 11C, continued rotation of the disk 53 and barrel cam 68 drives the cam follower 75 into and along cam track 68A of the cam 68 by continued advancing movement of follower 95B in cavity 53A while at the same time the cavity 53A of disk 53 recedes from the cam follower 95B. The bottle carrier transfer is completed, as shown in FIG. 11D, when the disk wall defining cavity 53A of disk 53 passes out of contact with cam follower 95B and at the same time cam follower 75 advances along cam track 68A of barrel cam 68 as shown.

Figure 9:
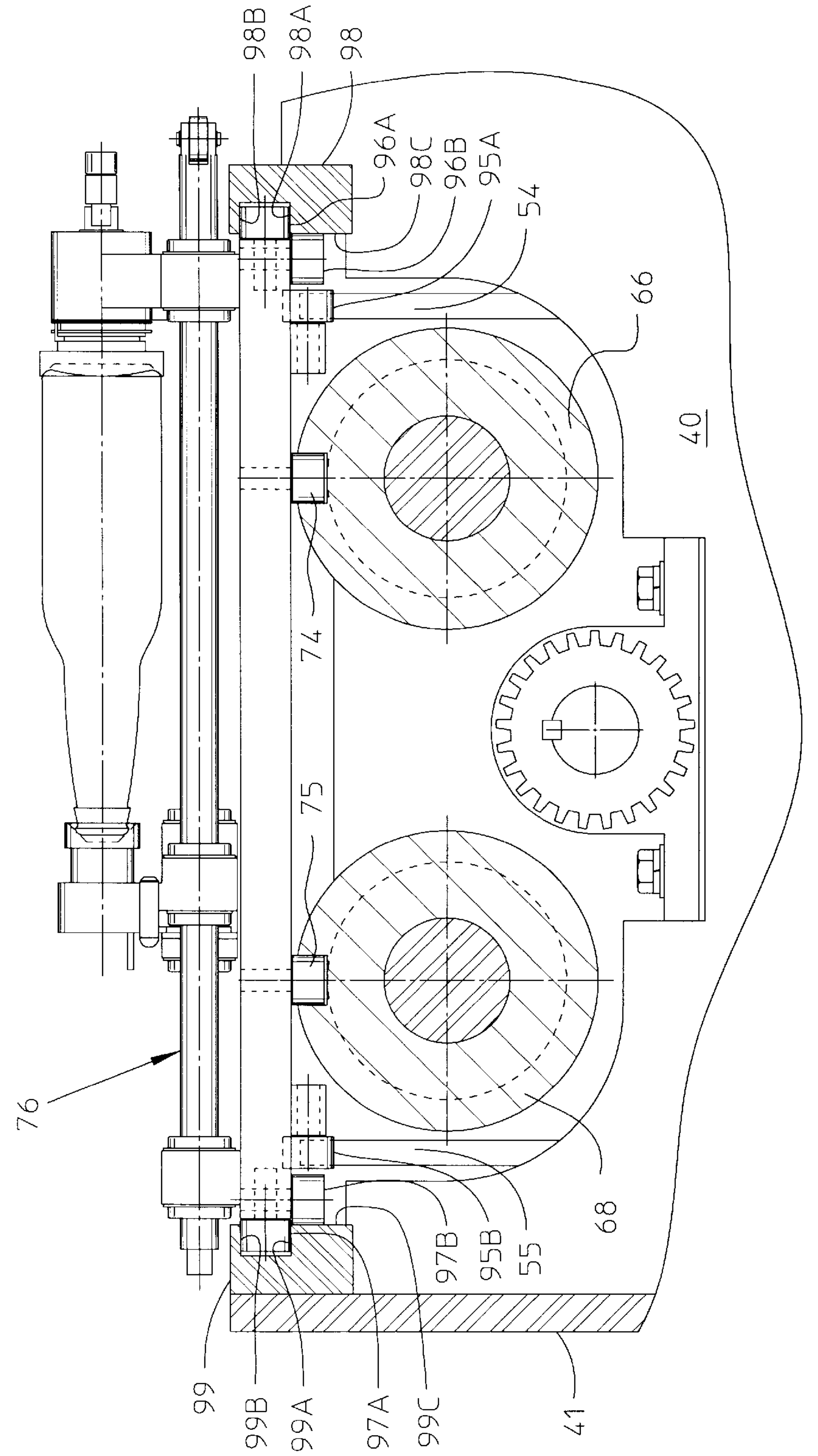
FIG. 9 is an enlarged view of the workpiece conveyance shown in FIG. 8.
Figure 10:
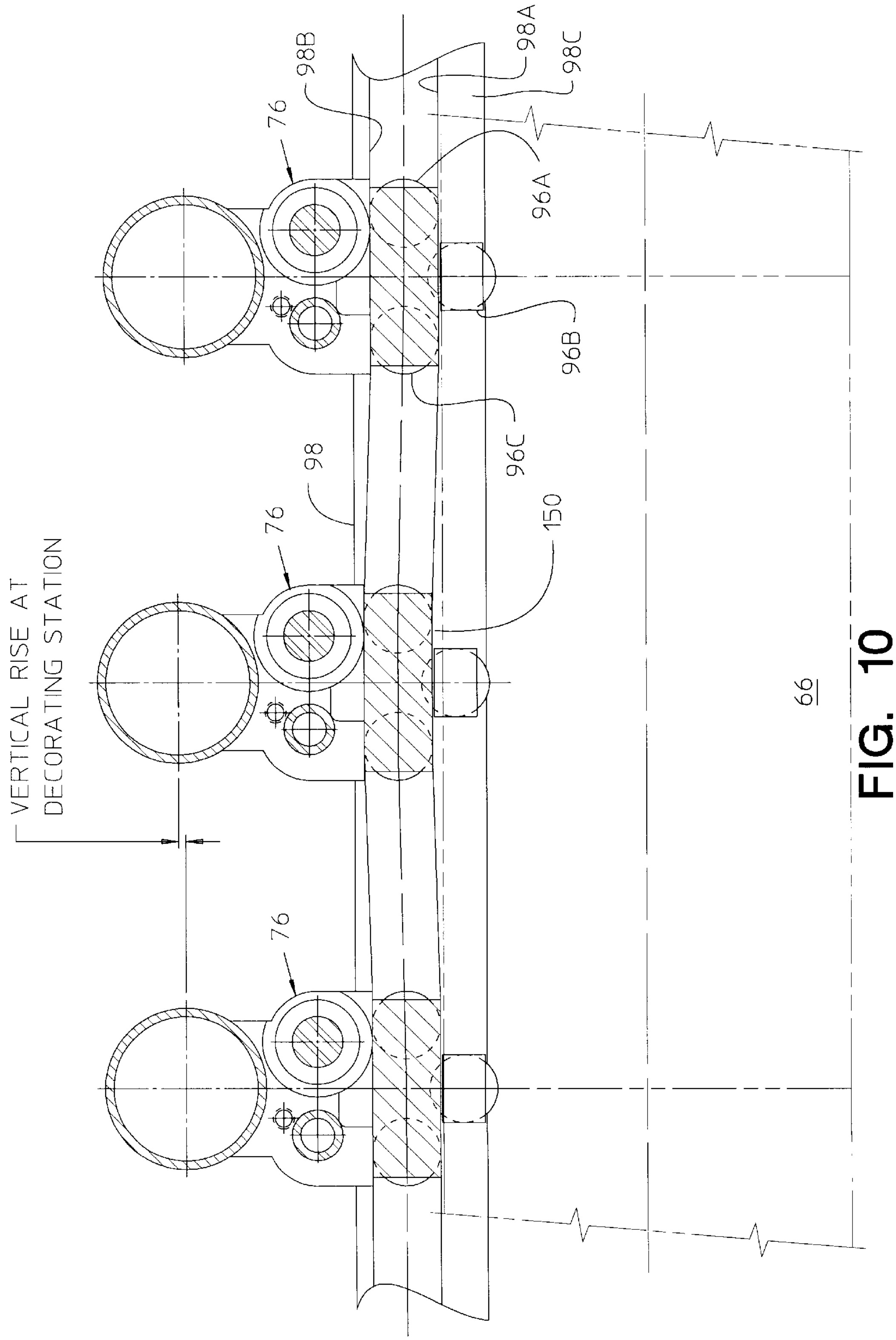
FIG. 10 is an enlarged elevation view in section at a decorating station taken along lines X—X of FIG. 8.

As shown in FIGS. 9, 10, 12B and 12C, a cluster of three spaced apart inboard guide rollers 96A, 96B and 96C are rotatably supported by the carrier plate 84 at its end most closely adjacent the decorating machine and a cluster of three spaced apart outer guide rollers 97A, 97B and 97C are rotatably supported by the carrier plate 84 at its end remote to the decorating machine. As best shown in FIGS. 9 and 10, secured to arms 40 extending from the decorating machine is an endless track plate 98 having a cavity wherein inboard guide rollers 96A and 96C engage opposed horizontal track surfaces 98A and 98B of the cavity. Guide roller 96B engages a vertical face surface 98C of the guide track. Secured to each of the arms 40 and plate 41 is an endless track plate 99 having a cavity wherein outer guide rollers 97A and 97C engage opposed horizontal track surfaces 99A and 99B of the cavity. Guide roller 97B engages a vertical face surface 99C of the guide track. The guidance provided by the cooperation between the guide rollers 96A, 96C, 97A and 97C which rotate about horizontal axes and the horizontal guide surfaces 98A, 98B, 99A and 99B provide load bearing support for the carrier; maintain cam followers 74 and 75 engaged with the cam tracks of cam 66, 68, 70 and 72 and maintain the carrier in a stable orientation during movement along the cam track. Guide rollers 96B and 97B which rotate about vertical axes prevent unwanted displacement of the carrier between the guide tracks 98 and 99 in a longitudinal axis of a bottle when supported by the carrier.

At each decorating station P1, P2 and P3 the arrangement of apparatus is identical. As shown in FIGS. 3, 4 and 8, it can be seen that the gear drive 29 has its output drive shaft connected to rotate the cam 32. A cam track 32A is machined into the cam 32 and received in the cam track is a cam follower 32D. The cam follower is mounted to a lever arm 100 which is in turn secured to the lower end of a vertical shaft 101. The shaft 101 is supported by spaced apart bearings, as shown in FIG. 8, which are in turn carried by a tubular column 102 supported by the base of the decorator machine 10. At the top of the column 102 there are superimposed oscillation arm assemblies 103 and 104. Assembly 103 is made up of a lever arm 105 secured to shaft 101 and provided with a guideway 106 extending radially of the shaft. In the guideway there is arranged a drive bar 107 which can be moved along the guideway by the threaded portion of a hand wheel 108. The distance the drive bar 107 is located radially of the rotational axis of shaft 101 is controlled by the hand wheel 108. A drive block 109 is mounted on a portion of the drive bar 107 projecting vertically above the guideway and reciprocates in an inverted "U" shaped slot formed in a drive bar 110. The drive bar is joined to a slide 111 supported in a guideway 112. The slide is held in a slot of guideway 112 by gib plates 113. While not shown, the slide 111 protrudes laterally from opposite sides of the tubular column 102 and is provided with outwardly spaced apart receiver arms 114 and 115. The receiver arm 114 engages a decorating screen assembly 116 that is reciprocated by the linear motion of the slide 111 to thereby reciprocate the decorating screen assembly along the body portion B1 of a bottle for carrying out decorating operations thereon. Assembly 104 includes a lever arm 119 secured to shaft 101 and provided with a guideway 120 extending radially of the shaft. In the guideway there is arranged a drive bar 121 which can be moved along the guideway by the threaded portion of a feed screw operated by a hand wheel 122. The distance the drive bar 121 is located radially of the rotational axis of shaft 101 is controlled by the hand wheel 122. A drive block 123 is mounted on a portion of the drive bar 121 projecting vertically downwardly from the guideway and reciprocates in a "U" shaped slot formed in a drive bar 124. The drive bar is joined to a slide 125 supported in a guideway 112. The slide 125 is held in a slot of guideway 112 by gib plates 126. The slide 125 protrudes laterally from opposite sides of the tubular column 102, in the same manner as slide 111 protrudes. Similarly, the receiver arm 115 engages a decorating screen assembly 118 that is reciprocated by the linear motion of the slide 125 to thereby reciprocate the decorating screen assembly along the neck portion N1 of a bottle for carrying out decorating operations thereon.

Hand wheels 108 and 122 are used to select a desired stroke for the screen reciprocation to match the circumferential distance of the bottle which is to be decorated. This matching relationship is critically significant because no relative motion between the screen movement and the bottle rotation can be accepted otherwise, smearing or poor quality decorating will occur. As shown in FIG. 8, squeegees 129 and 130 are carried by a support arm 131 in positions above the screens 116 and 118, respectively. The squeegee construction is per se is known in the art and is shown in U.S. Pat. No. 3,172,357. Each squeegee includes a squeegee rubber 132 on the end portion of a squeegee positioning cylinder operated pneumatically against the force of a return spring thereby to establish line contact between the screen assembly 116 and 118 and a bottle as the bottle is rotated in a synchronous speed with linear movement of the screens. The squeegees are adjustably located by fasteners engaged in a mounting slot 133 extending along the elongated length of the support arm 131.

At each decorating station there is provided as part of the screen drives, a drive to rotate a rotator assembly 136. As shown in FIG. 8, the rotator assembly includes a drive gear 143 which is located beneath lower arm 105 where the teeth of gear 143 mesh with teeth of an elongated rack 137. Rack 137 is secured to a slide 138 arranged in a slideway supported by a pedestal 142. The slide 138 is constrained in a slideway by gibs 139 to reciprocate in response to a driving force imparted to a "U" shaped drive bar 140. The driving force is imparted by a drive block 141 mounted in a slot formed in the underside of lower arm 105. Drive block 141 serves to convert oscillating motion of lower arm 105 to linear motion of the slide thereby reciprocating the rack 137. The teeth of the rack 137 mesh with gear teeth of a drive gear 143 mounted on an end portion of an arbor 144 which is rotatably supported by a bearing 145 mounted in a bearing housing secured to a face plate 146 mounted on the base 11. A rotator drive head 147 is secured to the end portion of the arbor 144 and formed with a slotted opening 148 extending transversely to the longitudinal axis about which the arbor 144 rotates. The slotted opening receives the drive roller 92 on a bottle carrier 76 as the carrier approaches a dwell position "D" in the course of travel along the decorating machine. When the drive roller 92 is received in the opening 148, a driving relationship is established whereby rotation of the rotator head 147 rotates the drive roller 92 and the crank arm 91 for rotating the bottle 360° at the bottle decorating station.

As shown in FIG. 10, at each decorating station where a workpiece carrier is brought to a dwell period "D" interrupting its course of traveling motion there is an elongated riser section 150 representing an elevation increase to guide surfaces 98A and 98B of the guide 98. At the outboard side of the workpiece conveyor there is at each decorating station an elongated riser section, not shown, horizontally aligned with an identical elongated riser section 150 of guide 98 and representing an elevation increase to guide surfaces 99A and 99B of the guide 99 whereby each workpiece carrier arriving at a decorating station is acted upon simultaneously by a riser section at each of the opposite ends of the workpiece carrier. The riser sections elevate the bottle carrier and thus the bottle supported thereby a short distance so that the decorating screens can freely reciprocate in either direction without impingement contact with adjacent bottles.

In FIGS. 2, 5, 7, 8, 12A and 12B, the bottles are supplied to the decorating machine by a conveyor, not shown, and introduced horizontally at a loading station 151 where each bottle is engaged between base cup 77 and neck chuck 79 of an associated one of the bottle carriers 76 and advanced by the driving relation between followers 95A and 95B interfitting and drivenly engaged in aligned cavities 52A and 53A, respectively, of supply disks 52 and 53 to the registration station 13. The bottle is rotated about its longitudinal axis by a rotator head constructed in the same manner as rotator 147 and rotated by a suitable drive while a registration finger extends into the path of travel of a registration cavity formed in the lower base portion of the bottle. When the registration finger passes into the registration cavity of the bottle, rotation of the bottle is stopped there is established a predetermined bottle orientation with respect to the decorating screens.

The predetermined bottle orientation establishes a predetermined registration of the workpiece with respect to the decorating screens at each of the spaced apart decorating stations. The registration process is particularly useful to orient seam lines extending along opposite sides of a bottle with respect to the location of the desired area for decoration. As shown in FIGS. 7 and 8, registration of the bottle is concluded with the orientation of the crank arm 91 such that the drive roller 92 trails the advancing movement of the bottle carrier to the decorating stations. As the drive roller 92 emerges from a slot in the rotator drive at the indexing station, the drive roller 92 is captured and guided by spaced apart guide rails 152 and 153. These guide rails extend along an endless path of travel by the drive roller 92 throughout the endless circulating movement of the workpiece carriers to thereby control the orientation of the crank arm and maintain registration of the bottle at each decorating station. At each of the decorating stations P1, P2 and P3 the continuity of the guide rails 152 and 153 is interrupted by a gap wherein a drive rotator 147 member is located to receive and rotate a bottle. Downstream of each gap in the guide rails 152 and 153 are outwardly protruding collector rail portions 152A and 153A that return the roller and crank arm to the gap between guide rails as the barrel cams 66 and 68 operate advancing the bottles after completion of the decorating to an unloading station 154.

Figure 13A:
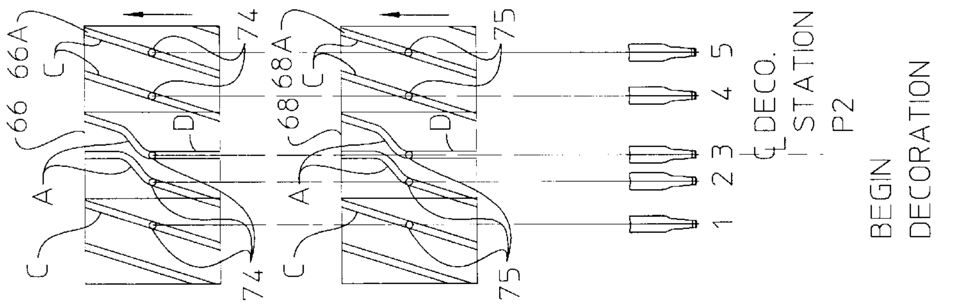
FIGS. 13A, 13B, 13C, 13D and 13E are timing sequence illustrations taken along lines XIII—XIII of FIG. 2 showing a cam track for imparting traveling motion and a dwell period in relation to a decorating station.
Figure 13B:
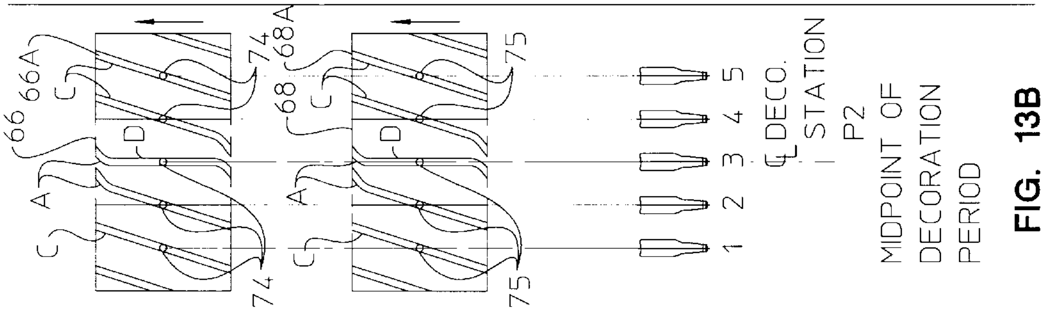
Figure 13C:
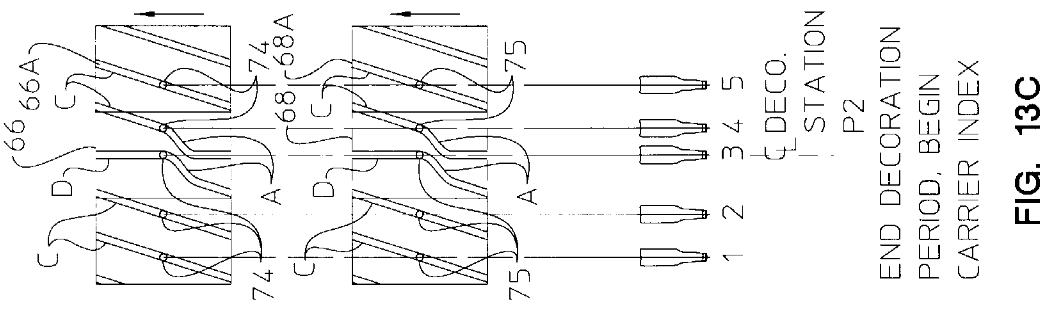
Figure 13D:
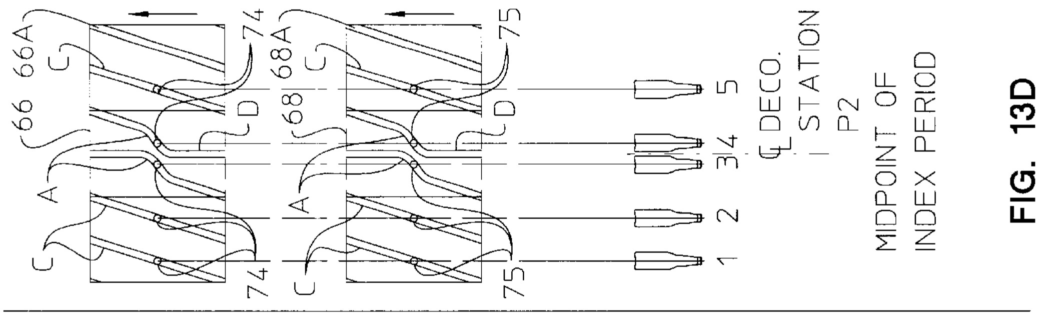

As can be seen from FIGS. 13A–13E, the motion imparted to each of the discrete bottle carriers according to the preferred embodiment of the present invention is made up of three components namely: a continuous traveling motion "C"; accelerated traveling motion "A"; and dwell period "D" which are identified in relation to the schematic illustration of cam tracks in segments of barrel cams 66 and 68 upstream and downstream of a decorating station identified as P2. In each of the FIGS. 13A–13E five bottles, 1–5 are shown, in their relative spaced relation during advancement to and from a dwell period "D" at a decorating station. As described and shown previously, a cam follower 74 engages in a closed cam track 66A and cam follower 75 engages in closed cam track 68A. In FIG. 13A, a vertical line extends between a cam follower 74 and a cam follower 75 to bottle 1 and intended schematically to represent that bottle 1 is carried by a bottle carrier while advanced by barrel cams. Similar relations are illustrated in regard to bottles 2, 3, 4 and 5. It is assumed for disclosure purposes that bottle 3 resides at the commencement of a dwell period "D" at the decorating station and the cam follower of the decorating machine resides at the commencement of the bottle decorating cycle 31C defined by the cam track 31A (FIG. 4). As the barrel cams 66 and 68 rotate in the direction indicated by arrows, bottle 3 remains stationary with respect to motion at the decoration station. Bottle 2 is at a site of exiting an accelerated travel motion "A" and entering cam track segment providing continuous traveling motion "C". The cam followers for bottles 1, 4 and 5 reside in cam track segments providing continuous traveling motion. In FIG. 13A bottles 2 and 3 are more closely spaced than the relative spacing between the remaining bottles. The bottles maintain an equally spaced apart relation as shown in FIG. 13B where bottle 3 has resided about one-half through the dwell period and bottles 1, 2, 4 and 5 are advanced by motion imparted by the cam part segments of cams 66 and 68 providing the continuous travel "C" and the cam follower of the decorating machine resides midway along the bottle decorating cycle 31C defined by cam track 31A of cam 31. At the end of the dwell period for bottle 3 the cam follower of the decorating machine resides at the conclusion of the bottle decorating cycle 31C defined by the cam track 31A and as shown in FIG. 13C, bottles 1, 2, 4 and 5 continue in the cam segment providing continuous travel "C" whereby bottles 1 and 2 have moved away from bottle 3 and bottles 4 and 5 have moved toward bottle 3. The cam followers for the carrier of bottle 3 are at the entrance of cam track providing accelerated travel "A" and the cam followers for the carrier for bottle 4 are at but not in the segment of the cam track providing accelerated motion "A".

Figure 13E:
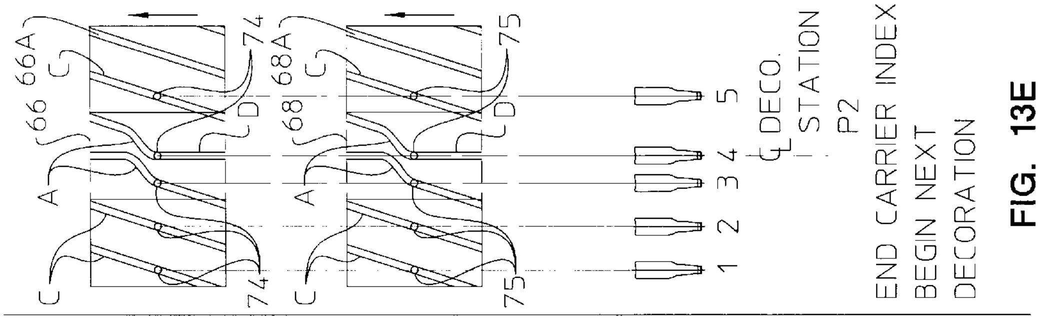

The cam follower of the decorating machine proceeds into the screen dwell cycle 31B defined by cam track 31A and remains in the screen dwell cycle until the arrival of a bottle at the dwell period "D" of the cams 66 and 68. As shown in FIG. 12D after bottle 3 has progressed in the accelerated travel motion "A", departing from the dwell period the cam followers for the carrier bottle 4 enter the accelerated travel motion "A" to rapidly introduce bottle 4 to the dwell period at the decorating station. In these relative motions, the distance between bottles 4 and 5 increases and the distance between bottles 3 and 4 decreases as depicted in FIG. 13E where bottle 4 arrives at the dwell period "D" at decorating station and bottle 3 emerges from the segment of the cam track providing acceleration and enters the segment of the cam track providing continuous traveling motion "C".

In the preferred embodiment of the present invention, the continuous traveling motion is provided by cam track segments designed to advance the bottles at a constant speed. The only cyclic loading of the drive system occurs during the acceleration period when a bottle is in transition from a continuous traveling motion to a dwell period and from the dwell period through an accelerated traveling motion to continuous traveling motion. The bottle carriers advance with a continuous traveling motion by the supply disks 52 and 53; carrier return disks 54 and 55; and barrel cams 70 and 72. Thus a significant improvement is provided by the present invention by eliminating a massive drive system to repetitively advance a chain conveyor through intermittent motions. Stress and strain on the drive components are greatly reduced to that of overcoming friction of continuous moving carriers and the short periods of accelerated travel movement proximate the dwell period at a decorating station. The downtime needed in the past to align decorating equipment to a dwell position of a carrier on a chain conveyor for chain stretch is eliminated. Thus the present invention enables printing of a multiplicity of colors greatly exceeding the limit printing capabilities using a chain conveyor.

Figure 14:
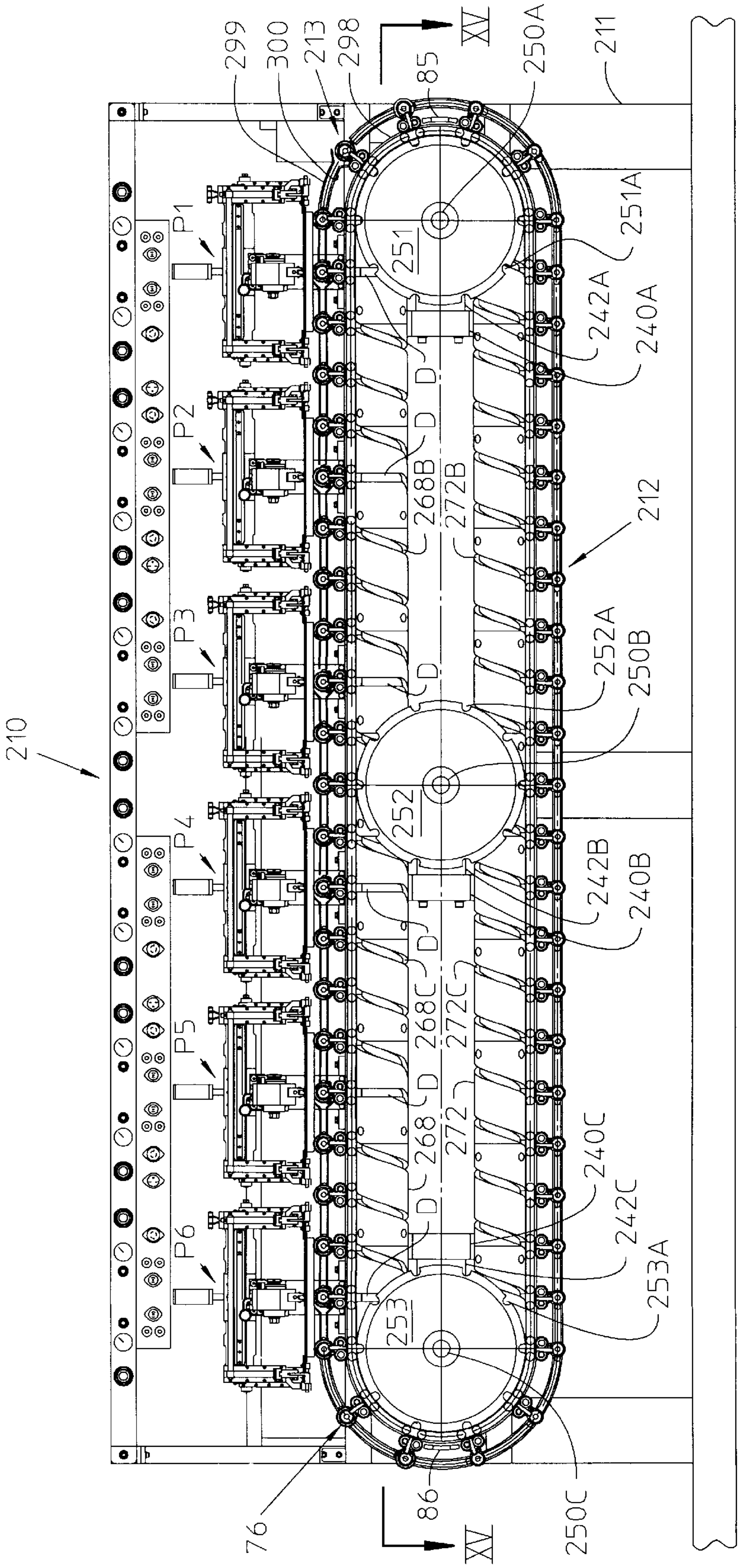
FIG. 14 is a front elevational view in section similar to FIG. 2 and illustrating a second embodiment of a workpiece conveyance for an intermittent decorating machine.
Figure 15:
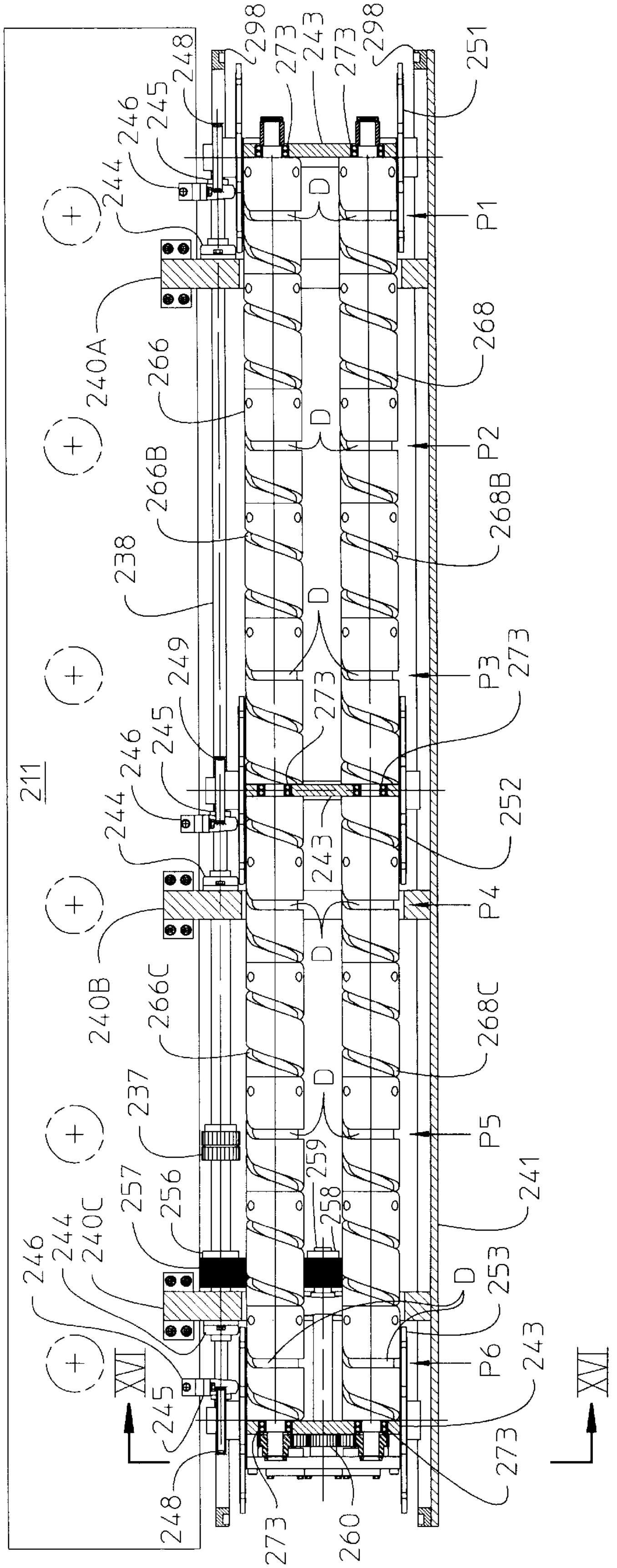
FIG. 15 is a sectional view taken along lines XV—XV of FIG. 14.

The arrangement of parts for imparting the traveling motion to workpieces delivered to and from decorating stations provides an option to greatly increase the distance workpieces travel along the decorating machine without the need to reduce the bottle through put rate because the mass of a chain conveyor system and workpieces supported thereby are not repetitiously indexed through a predetermined distance by starting and stopping each time a workpiece is indexed the predetermined distance. As shown in FIGS. 14 and 15, a decorating machine 210 includes a base 211 for supporting a workpiece conveyor 212 which receives bottles from bottle loading equipment, not shown, and advances the bottles to a registration station 213 and thence to six spaced apart decorating stations P1, P2, P3, P4, P5 and P6. The bottles are advanced from the last decorating station P6 to bottle unloading equipment, not shown.

The drive arrangement for the decorating machine 210 is expanded from the drive for the decorating machine 10 as shown in FIGS. 3–6 and described hereinbefore by providing that the line shaft 17 driven by motor 15 is elongated sufficiently to provide additional length to mount the necessary six pulleys to drive six gear drives, one for each of the six decorating stations P1–P6. Illustrated in FIG. 15 is a line shaft 238 on which there is mounted a pulley 237 which is driven by a belt extending to a pulley on a drive gear in the same manner as belt 36 was provided to drive pulley 37 illustrated and described hereinbefore. The line shaft 238 is rotatably supported by three spaced apart arms 240A, 240B and 240C which extend from the base 211 in a cantilever fashion and secured by bolts to the base of the decorating machine. The outer most ends of arms 240A, 240B and 240C are connected to an elongated cover plate 241. As shown in FIG. 14, secured to each of the arms 240A, 240B and 240C are spaced apart spacers 242A, 242B and 242C, respectively, of which spacers 242A and 242C extend horizontally and outwardly in opposite directions from arms 240A and 240C, respectively. Spacers 242B extend in a direction toward arms 240A. The outer ends of spacers 242A, 242B and 242C each carry a vertically extending mounting plate 243 to which various drive gears are supported and will be described in greater detail hereinafter.

Figure 16:
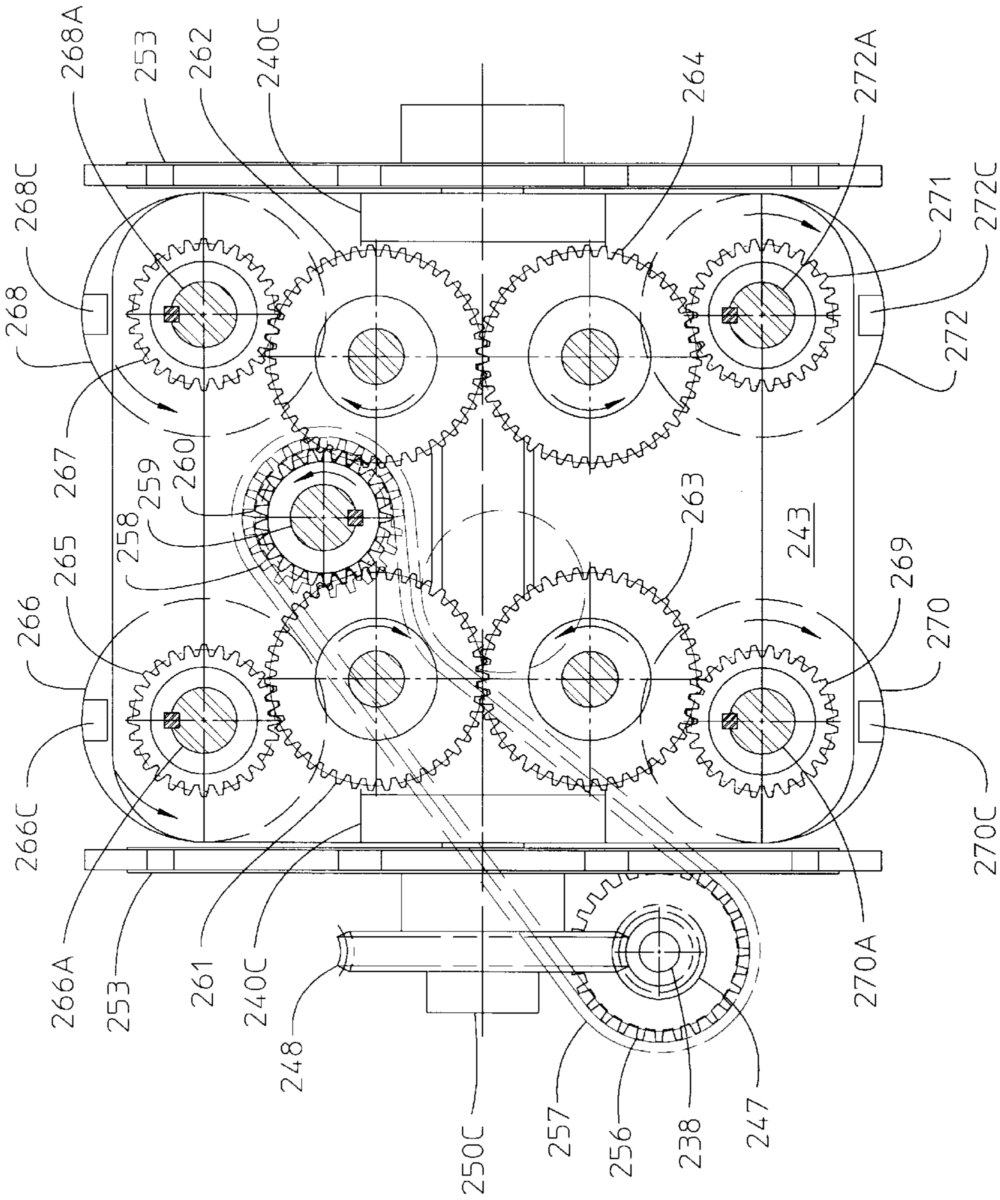
FIG. 16 is an enlarged elevational view taken along lines XVI—XVI of FIG. 15.

The line shaft 238 is rotatably supported by bearings 244 mounted on portions of arms 240A, 240B and 240C adjacent the base 211 and latterly outwardly of each of the bearings and midway along the length of the line shaft 238 there is also a bearing assembly 245 mounted by a carrier bracket 246 to the base 211 to rotatably support the line shaft. Spaced from each bearing assembly 245 there is a worm gear 247 (FIG. 16) mounted on the line shaft 238. The worm gears 247 at the loading and unloading ends of the decorating machine each mesh with a gear wheel 248 and the worm gear 247 proximately midway along the length of the line shaft 238 meshes with a gear wheel 249. The gear wheels 248 and gear wheel 249 are mounted on drive shafts 250A, 250B and 250C, respectively. Spaced apart carrier supply disks 251 are mounted on the inboard and outboard ends, respectively, of drive shaft 250A; spaced apart carrier transfer disks 252 are mounted on the inboard and outboard ends, respectively, of drive shaft 250B; and spaced apart carrier return disks 253 are mounted on the inboard and outboard ends, respectively, of drive shaft 250C as shown in FIG. 16. A pulley 256 is mounted on the line shaft 238 and joined by a drive belt 257 to a pulley 258 mounted on a drive shaft 259 extending horizontally between and above the drive shaft 250C. As shown in FIGS. 15 and 16, a drive pinion gear 260 is mounted on the horizontally extended end of drive shaft 259 and meshes with idler gears 261 and 262 which in turn mesh with idler gears 263 and 264, respectively. Idler gear 261 meshes with a drive gear 265 mounted on a support shaft of a barrel cam 266; idler gear 262 meshes with a drive gear 267 mounted on a support shaft of a barrel cam 268; idler gear 263 meshes with a drive gear 269 mounted on a support shaft of a barrel cam 270; and idler gear 264 meshes with a drive gear 271 mounted on a support shaft of a barrel cam 272.

As shown in FIGS. 15 and 16, the barrel cam 266, 268, 270 and 272 are mounted on shafts 266A, 268A, 270A and 272A, respectively, which are in turn rotatably supported by bearings 273 carried on the support shafts at opposite ends and in the middle region along the length of each barrel cam. The bearings 273 are mounted in suitable apertures formed in the vertically extending mounting plate 243 such that the barrel cams can rotate about horizontal axes with the axes of barrel cams 266 and 268 lying in a common horizontal plane and there below the axis of rotation of barrel cams 270 and 272 lie in a common horizontal plane. Each of the barrel cams 266, 268, 270 and 272 are made up of two tandemly arranged barrel sections separated by a bearing 273 in the mid region of the length of the cams thus barrel cam 266 has a first closed cam track 266B extending to a second closed cam track 266C; barrel cam 268 has a first closed cam track 268B extending to a second closed cam track 268C; barrel cam 270 has a first closed cam track, not shown, which is identical to and extends to a second closed cam track 270C; and as shown in FIG. 14 barrel cam 272 has a first closed cam track 272B extending to a second closed cam track 272C. Each of the closed cam tracks is a continuous groove milled in the cam body and engaged by a roller of the cam followers 74 or 75 of each bottle carrier 76. The milled grooves each define the dwell period "D" continuous traveling motion "C" and accelerated traveling motion "A" for executing bottle carrier movement as described herein before and illustrated in FIGS. 13A and 13E.

The movement of workpiece carriers to carry out a decorating operation on a bottle is the same as the first embodiment and the sequence of carrier motions is the same at each decorating station P1–P6 as illustrated in FIGS. 13A–13E as described herein before. As shown in FIG. 14, distributed about the outer periphery edges of the pairs of carrier supply disks 251, transfer disks 252 and carrier return disks 253 are horizontally aligned cavities 251A, 252A and 253A which receive the follower rollers 95A and 95B of each bottle carrier 76 as the follower rollers 95A and 95B pass out of engagement with cam tracks of barrel cams 266, 268, 270 and 272. The aligned cavities 252A of the carrier transfer disks 252 function to transfer carriers passing from one closed cam track to the second closed cam track forming each of the cams. Secured to the arms 240A, 240B and 240C extending from the decorating machine are two spaced endless track plates 298 which functions in the same manner as the guide rollers of bottle carriers as previously described in the first embodiment by endless track plates 98 and 99. Similarly, there is also provided the same spaced apart arrangement of guide rails 299 and 300 extending along an endless path to control the orientation of the crank arms 91 during continuous advancing movement by the bottle carriers.

Figure 17:
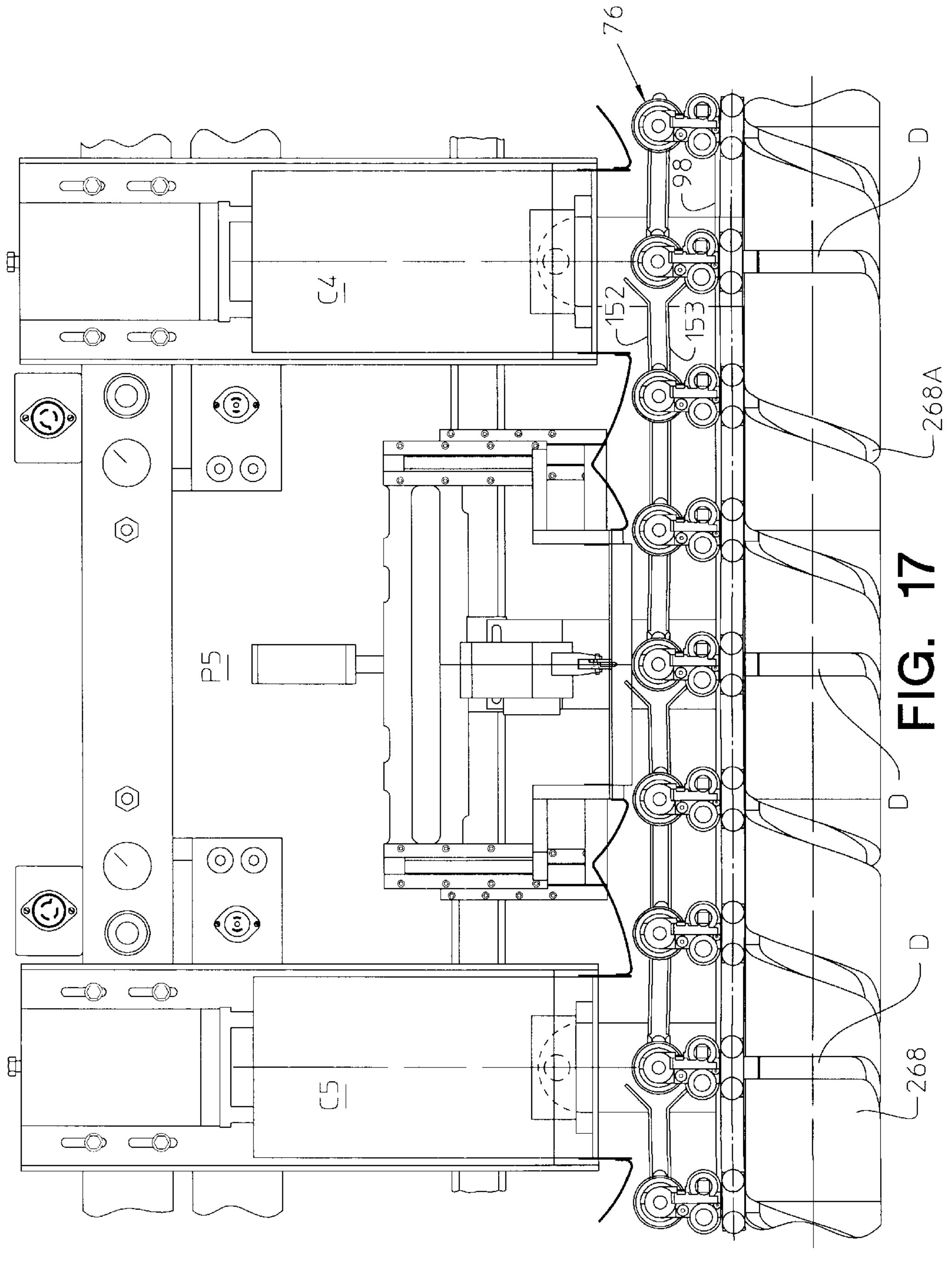
FIG. 17 is an enlarged front elevation view in section similar to FIG. 14 and illustrating a third embodiment of the decorating machine according to the present invention.

According to another embodiment of the present invention shown in FIG. 17 the decorating stations P1–P6 of the embodiment as described and shown in FIGS. 14–16 are reorganized by interposing a curing station downstream of each decorating station. The barrel cams 266 and 268 are provided with an additional dwell period "D" for each of the curing stations. In FIG. 17, only curing stations C4 and C5 are shown in relation to decorating station P5. In this embodiment the cams 266 and 268 embody an extended length sufficient to provide the necessary additional dwell periods "D" for each curing station. If desired, additional barrel cams maybe arranged in an end-to-end relation to rotate coaxially with barrel cams 266 and 268 to provide dwell periods "D" for each decorating station and each curing station. Such additional barrel cams will be constructed and arranged identically with barrel cams 266 and 268. Each curing station located down stream of a decorating station operates to cure ink applied at a decorating station up stream of the curing station. The decorating machine embodies a construction of parts providing the structure necessary to carryout curing at each of the curing stations in the same manner as disclosed in co-pending application Ser. No. 079,753, filed Apr. 15, 1998 which disclosure is incorporated by this reference thereto and for providing the drive systems and arrangement of parts to rotate workpieces at each curing station and decorating station during the dwell period "D" provided by cams 266 and 268.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. Apparatus to advance workpieces for applying decoration, said apparatus including the combination of:

an intermittent motion decorator having a decorating station at which a workpiece dwells while decoration is applied thereto;

a plurality of independent carriers each having workpiece support members to support a workpiece for traveling advancing movement relative to said decorating station, each of said carriers including a cam follower and carrier guide members;

at least one workpiece feed cam having a feed cam track receiving cam followers of said carriers for imparting traveling motion to advance said carriers relative to said decorating station, said cam track defining at least a continuous carrier traveling motion during which a plurality of said carriers advance independently and continuously toward said decorating station during decoration of a workpiece on a carrier dwelling at said decorating station for a dwell period defined by said cam track the space between the workpiece being decorated and the workpiece next to be decorated ever decreasing while at the same time the space between the workpiece being decorated and the last decorated workpiece ever increasing;

a drive to rotate said workpiece feed cam; and guides engaged with said carrier guide members for supporting said carriers and maintaining said feed cam follower of each of said carriers drivingly engaged with said feed cam track.

2. The apparatus according to claim 1 wherein said feed cam track comprises a continuous groove in a barrel cam defining said workpiece feed cam.

3. The apparatus according to claim 2 wherein said guides include a horizontal and vertical guides traversing said decorator between entry and discharge stations for workpieces and extending along a return path for carriers passing from said discharge station to said entry station.

4. The apparatus according to claim 3 wherein said horizontal and vertical guides are spaced apart to extend along opposite ends of said plurality of said carriers to capture said carrier guide members on said carriers to prevent dislodgment of the carrier from said guides.

5. The apparatus according to claim 4 wherein said horizontal guide includes vertically spaced and opposing horizontal guide surfaces and said vertical guide includes a vertical guide surface.

6. The apparatus according to claim 1 wherein each of said plurality of said independent workpiece carriers include an elongated base, said guides being located at each end of said carrier and said carrier guide members include at each end of said carrier three spaced apart guide rollers, two of said guide rollers being mounted to rotate about horizontal axes and the third of said guide rollers being mounted to rotate about a vertical axis.

7. The apparatus according to claim 1 wherein said workpiece support members for each of said carriers include a base cup and a neck chuck to releasably support a workpiece and wherein each of said carriers further include a support shaft and an actuator shaft for supporting said neck chuck, bearings supported by an elongated carrier plate for slidably supporting said actuator shaft, an actuator cam follower mounted on an end of said actuator shaft proximate said decorator, and an actuator cam for engaging said actuator cam follower at each of loading and unloading stations for receiving and discharging workpieces between said base cup and neck chuck.

8. The apparatus according to claim 1 wherein said at least one workpiece feed cam comprises two spaced apart and side-by-side workpiece feed barrel cams rotatably supported by bearings at opposite ends thereof for rotation about horizontal axes, said workpiece feed cams having feed cam tracks defining a workpiece dwell period at said decorating station and a workpiece advancement period at each of loading and unloading stations, and wherein said drive to rotate said workpiece feed cam drives said side-by-side workpiece feed barrel cams for simultaneous rotation thereof and wherein said at least one feed cam follower comprises two spaced apart carrier cam followers driven by said workpiece feed cam tracks, and wherein said carrier includes an elongated carrier plate for supporting said spaced apart carrier cam followers.

9. The apparatus according to claim 8 further including at least one carrier return cam having a carrier return track receiving said carrier cam followers for advancing carriers from said unloading station to said loading station, and a carrier return drive to rotate said carrier return cam for advancing said carrier cam followers along the carrier return cam track.

10. The apparatus according to claim 9 wherein said at least one carrier return cam comprises two spaced apart and side-by-side carrier return cams rotatably supported by bearings at opposite ends for rotation about parallel horizontal axes generally parallel with the axes of rotation of said workpiece feed cams, said carrier return drive being drivingly interconnected with said carrier return cams for simultaneous rotation thereof.

11. The apparatus according to claim 8 wherein said two spaced apart and side-by-side workpiece feed barrel cams each further include consecutive barrel cams coaxially aligned and driven to rotate about a common axis and bearings rotatably supporting each of the opposite ends of said consecutive barrel cams; and wherein said apparatus further includes carrier transfer members for transferring carriers from one of said consecutive barrel cams to the other thereof.

12. The apparatus according to claim 1 further including at least one carrier return cam having a carrier return cam track receiving said carrier cam followers for advancing said carriers from a discharge station to a loading station, a return cam drive to rotate said return cam for advancing said carrier cam followers along the carrier return cam track, carrier transfer members at opposite ends of said workpiece feed cam and said carrier return cam for transferring carriers from to said loading station from said carrier return cam and from said unloading station to said carrier return cam.

13. The apparatus according claim 12 wherein said carriers and said carrier transfer members include interfitting members for establishing a driving relation therebetween, and a carrier transfer drive for advancing a carrier between said loading station and said unloading station.

14. The apparatus according to claim 13 wherein said interfitting members include a transfer cam follower on said carrier and a cavity formed in said carrier transfer member to receive said transfer cam follower.

15. The apparatus according to claim 14 wherein said carrier transfer members includes carrier disks rotatably supported by bearings and coupled to said carrier transfer drive for rotation of said carrier disks.

16. The apparatus according to claim 1 wherein said decorator includes a decorating screen to apply a curable printing medium while reciprocated between a squeegee and a workpiece supported by said carrier at said decorating station, a workpiece drive to rotate a workpiece while supported by said base cup and neck chuck at said decorating station, and wherein said apparatus further includes a carrier riser cam for raising said carrier to an elevated site for decorating a workpiece at said decorating station and lowering said carrier while discharged from the decorating station.

17. The apparatus according to claim 1 wherein said at least one feed cam includes consecutive barrel cams coaxially aligned and driven to rotate about a common axis and bearings rotatably supporting each of the opposite ends of said consecutive barrel cams; and wherein said apparatus further includes carrier transfer members for transferring carriers from one of said consecutive barrel cams to the other thereof.

18. The apparatus according to claim 17 wherein said at least one feed cam further includes a shaft for supporting said consecutive barrel cams, said drive being drivenly connected to said shaft for simultaneous rotation of said barrel cams.

19. The apparatus according to claim 1 further including at least one carrier return cam having consecutive barrel cams coaxially aligned and driven to rotate about a common axis and bearings rotatably supporting each of the opposite ends of said consecutive barrel cams, said consecutive barrel cams having a carrier return track receiving said carrier cam followers for advancing carriers from said unloading station to said loading station, a carrier return drive to rotate said carrier return cam for advancing said carrier cam followers along the cam tracks of said consecutive barrel cams the carrier return cam track, and carrier transfer members for transferring carriers from one of said consecutive barrel cams to the other thereof.

20. The apparatus according to claim 19 wherein said at least one carrier return cam comprises two spaced apart and side-by-side workpiece feed cams each having consecutively arranged barrel cams to rotate about a common axes.

21. Apparatus to advance workpieces for applying decoration, said apparatus including the combination of:

a decorator having a plurality of decorating stations spaced along a path of travel for workpieces between entry and discharge paths for applying decoration to workpieces;

a plurality of carriers each having a base cup and a neck chuck spaced apart for supporting a workpiece and a rotator for rotating a workpiece supported thereby about a longitudinal axis of the workpiece, each carrier further including a carrier plate supporting said base cup and a neck chuck on one side thereof and spaced apart cam followers supported on a side of said base opposite said base cup and said neck chuck, each of said carriers further including horizontal and vertical support members carried at each of opposite ends of said carrier plate;

spaced apart endless guide tracks extending along the path of travel for workpieces in an endless fashion along said plurality of decoration stations engaging said horizontal and vertical support members to guide said carriers;

a pair of workpiece feed cams rotatably supported in a side-by-side relation to rotate about spaced horizontal axes lying in a common horizontal plane, said workpiece feed cams having feed cam tracks extending along said decorator between loading and unloading stations for receiving said cam followers of each of said plurality of carriers, said feed cam track defining a workpiece dwell period at each of said decorating stations and workpiece advancement periods between each workpiece dwell period;

a pair of carrier return cams rotatably supported in a side-by-side relation to rotate about spaced horizontal axes lying in a common horizontal plane, said carrier return cams having carrier cam tracks extending along said decorator for returning carriers received from said unloading station for delivery to said loading station;

carrier transfer members at each of opposite ends of said workpiece feed cams and said carrier return cams for transferring carriers from said workpiece feed cams at said unloading station to said carrier return cams and for transferring carriers from said carrier return cams to said workpiece feed cams at said loading station; and a drive to rotate said workpiece feed cams, carrier return cams and carrier transfer members.

22. The apparatus according to claim 21 wherein said carrier transfer members comprise transfer disks mounted in a spaced apart relation on a drive shaft at each end of said workpiece feed cams to rotate about axis transverse to the rotation axis of said workpiece feed cams, said transfer disks on each drive shaft having arcuate cavities spaced apart along the periphery of each disk and wherein said plurality of carriers each have annular members discrete from said feed cam followers engageable in said annular cavities of said transfer disks for establishing a driving relation there between.

23. The apparatus according to claim 21 wherein said horizontal and vertical support members carried at each of opposite ends of the base comprise three spaced apart guide rollers, two of said guide rollers being rotatably mounted on said carrier plate to rotate about vertical axes and a third of said guide rollers being mounted on said carrier plate to rotate about a horizontal axis.

24. A method for advancing workpieces to apply decoration, said method including the steps of:

engaging opposite ends of successive ones of a plurality of workpieces for support about an longitudinal axis of each workpiece;

continuously advancing a plurality of spaced apart workpieces toward and a plurality of decorated workpieces away from a workpiece being decorated during a dwell period at a decorating station, the space between the workpiece being decorated and the workpiece next to be decorated ever decreasing while at the same time the space between the workpiece being decorated and the last decorated workpiece ever increasing;

decorating each workpiece at the decorating station;

terminating the dwell period of the decorated workpiece at the decorating station by advancing the decorated workpiece from the decorating station; and advancing the next workpiece to be decorated.

25. The method according to claim 24 wherein said step of decorating each workpiece includes rotating the workpiece about longitudinal axis thereof at the decoration station.

26. The method according to claim 24 wherein said step of decorating each workpiece further includes: lifting the workpiece vertically at the decorating station; and reciprocating a decorating screen between a squeegee and a workpiece for applying decoration to the workpiece while rotated at the decorating station.

27. The method according to claim 24 including the further step of providing a plurality of decorating stations at horizontally spaced apart sites along a path of travel by said plurality of workpieces and wherein said step of continuously advancing spaced apart workpieces includes advancing a workpiece toward and a decorated workpiece away from a workpiece being decorated at each of said plurality of decorating stations, the space between the workpiece being decorated at each decorating station and the next workpiece to be decorated at that decorating station ever decreasing and the space between the workpiece being decorated at that decorating station and the last decorated workpiece ever increasing.

28. The method according to claim 27 including the further steps of: discharging decorated workpieces delivered from the last of said plurality of said decorating stations from carriers supporting each of said plurality of workpieces; conveying successive ones of said carriers from the horizontal path of travel containing said decorating stations to a horizontal path of return travel vertically spaced from the decorating stations; and returning successive ones of said carriers from said return travel to the horizontal path of travel containing said decorating stations while concurrently performing said step of engaging opposite ends of successive ones of a plurality of workpieces.

29. The method according to claim 24 wherein said step of continuously advancing spaced apart said workpieces includes advancing a workpiece at a uniform rate of travel toward and a decorated workpiece away from a workpiece being decorated during a dwell period at a decorating station, discharging a workpiece from said decorating station at an accelerated rate of travel greater than said uniform rate of travel and thereafter accelerating a workpiece from said uniform rate of travel to said decorating station.

* * * * *